(12) United States Patent
Um et al.

(10) Patent No.: US 12,238,176 B2
(45) Date of Patent: *Feb. 25, 2025

(54) METHOD AND DEVICE FOR CONTROLLING HOME DEVICE

(71) Applicant: SAMSUNG ELECTRONICS CO., LTD., Suwon-si (KR)

(72) Inventors: Tae-kwang Um, Suwon-si (KR); Young-ki Kim, Seoul (KR); Jeong-yi Park, Suwon-si (KR); Hyun-cheol Park, Suwon-si (KR); Dong-hun Shin, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/834,056

(22) Filed: Jun. 7, 2022

(65) Prior Publication Data

US 2022/0303341 A1     Sep. 22, 2022

Related U.S. Application Data

(63) Continuation of application No. 16/297,147, filed on Mar. 8, 2019, now Pat. No. 11,356,512, which is a (Continued)

(30) Foreign Application Priority Data

Jan. 2, 2015 (KR) .................. 10-2015-0000290

(51) Int. Cl.
  *G06F 15/16*     (2006.01)
  *H04L 67/125*   (2022.01)
  (Continued)

(52) U.S. Cl.
  CPC .......... *H04L 67/125* (2013.01); *H04L 67/303* (2013.01); *H04L 67/52* (2022.05)

(58) Field of Classification Search
  CPC ..... H04L 67/125; H04L 67/18; H04L 67/303; H04L 12/2827; H04L 12/2829;
  (Continued)

(56) References Cited

U.S. PATENT DOCUMENTS 8,326,794 B1 * 12/2012 Wood .................. H04L 43/0817
                                                                707/600
9,645,832 B2     5/2017 Preston
  (Continued)

FOREIGN PATENT DOCUMENTS

CA    2513019 A1       1/2007
EP    2538263 A1 * 12/2012 ................ F24C 7/04
  (Continued)

OTHER PUBLICATIONS

Multiple Loads-Single Smart Meter for Measurement and , Control of Smart Grid 2019 IEEE PES Innovative Smart Grid Technologies Asia, Brandon S. England and Ali T. Alouani, Senior Member, IEEE Department of ECE Tennessee Tech University 2019 IEEE PES Innovative Smart Grid Technologies Asia (Year: 2019).*

(Continued)

*Primary Examiner* — Yves Dalencourt
(74) *Attorney, Agent, or Firm* — Sughrue Mion, PLLC

(57) ABSTRACT

A method by which a server controls plural devices includes receiving a trigger signal generated by a sensor in a home in response to a mobile device being present at a specific location in the home, determining devices corresponding to the specific location by using the trigger signal, receiving context information indicating a situation of a user from the mobile device, selecting context information related to operations of the determined devices from among the (Continued)

received context information by using keywords respectively related to the devices, each of the operations corresponding to each of the devices, and providing the selected context information to the devices respectively so that each of the devices performs the operations.

20 Claims, 16 Drawing Sheets

Related U.S. Application Data continuation of application No. 14/987,405, filed on Jan. 4, 2016, now Pat. No. 10,250,691.

(60) Provisional application No. 62/121,958, filed on Feb. 27, 2015.

(51) Int. Cl.
   *H04L 67/303* (2022.01)
   *H04L 67/52* (2022.01)

(58) Field of Classification Search
   CPC ............. H04L 12/2803; H04L 12/2807; H04L 12/2809; H04L 12/2812; H04L 12/2816; H04L 43/00; H04L 67/535; G06F 11/34
   USPC ........................................................ 709/205
   See application file for complete search history.

(56) References Cited

U.S. PATENT DOCUMENTS

| | | | |
|---|---|---|---|
| 10,002,524 B2 | 6/2018 | Shim et al. | |
| 10,768,784 B2* | 9/2020 | Shearer ............... | H04L 12/2823 |
| 2008/0242418 A1 | 10/2008 | Theimer et al. | |
| 2011/0254683 A1 | 10/2011 | Soldan et al. | |
| 2012/0078959 A1* | 3/2012 | Cho .................... | H04L 12/2803 |
| | | | 707/E17.014 |
| 2012/0093303 A1* | 4/2012 | Schultz ............. | H04M 1/72454 |
| | | | 379/159 |
| 2013/0052946 A1 | 2/2013 | Chatterjee et al. | |
| 2013/0185750 A1* | 7/2013 | Ayoub ............... | H04N 21/4882 |
| | | | 725/34 |
| 2014/0028921 A1* | 1/2014 | Moon ................ | H04N 21/4725 |
| | | | 348/734 |
| 2014/0167929 A1 | 6/2014 | Shim et al. | |
| 2014/0215526 A1 | 7/2014 | Yokochi | |
| 2014/0244001 A1 | 8/2014 | Glickfield et al. | |
| 2014/0244710 A1 | 8/2014 | Sharma et al. | |
| 2014/0258363 A1* | 9/2014 | Peco ........................ | H04L 51/52 |
| | | | 709/202 |
| 2014/0293314 A1* | 10/2014 | Amarendra ............. | G06F 21/35 |
| | | | 358/1.14 |
| 2015/0039104 A1* | 2/2015 | Nakatani ............. | H04L 12/2818 |
| | | | 700/83 |
| 2015/0139468 A1 | 5/2015 | Feilner et al. | |
| 2015/0199961 A1* | 7/2015 | Arkko ..................... | G06F 3/167 |
| | | | 704/251 |
| 2015/0221151 A1 | 8/2015 | Bacco et al. | |
| 2015/0339031 A1* | 11/2015 | Zeinstra ................. | B60K 37/06 |
| | | | 715/747 |
| 2015/0370615 A1* | 12/2015 | Pi-Sunyer ............ | H05B 47/105 |
| | | | 719/328 |
| 2015/0372832 A1* | 12/2015 | Kortz ..................... | G05B 13/04 |
| | | | 700/278 |
| 2015/0373022 A1 | 12/2015 | Dubman et al. | |
| 2016/0057139 A1 | 2/2016 | McDonough et al. | |
| 2016/0085412 A1 | 3/2016 | Meganathan et al. | |
| 2016/0291671 A1* | 10/2016 | Rider ..................... | G06F 1/3209 |
| 2016/0303739 A1 | 10/2016 | Apkarian et al. | |
| 2017/0155749 A1 | 6/2017 | Ranganathan et al. | |

FOREIGN PATENT DOCUMENTS

| | | | |
|---|---|---|---|
| EP | 2675195 A2 | 12/2013 | |
| EP | 2868041 B1 | 6/2020 | |
| JP | 2012-138820 A | 7/2012 | |
| KR | 10-2014-0077127 A | 6/2014 | |
| WO | 2015041882 A1 | 3/2015 | |
| WO | 2016054095 A1 | 4/2016 | |

OTHER PUBLICATIONS

U Multiple Loads-Single Smart Meter for Measurement and , Control of Smart Grid 2019 IEEE PES Innovative Smart Grid Technologies Asia, Brandon S. England and Ali T. Alouani, Senior Member, IEEEDepartment of ECE Tennessee Tech University 2019 IEEE PES Innovative Smart Grid Technologies Asia(Year: 2019 (Year: 2019).*

Context-aware application framework based on Open Service Gateway, Joong-Han Kim; Sung-su Yae; R. S. Ramakrishna, 2001 International Conferences on Info-Tech and Info-Net. Proceedings (Cat. No. 01EX479), Year: 2001 | vol. 5 | Conference Paper | Publisher: IEEE (Year: 2001).

Low-Cost Android App Based Voice Operated Room Automation System, Prasanmit Nath; Umesh Chandra Pati, 2018 3rd International Conference for Convergence in Technology (I2CT) (Year: 2018).

Smart device contributing to realizing Smart Society, and the relating International Standards, Takuya Iijima, 2017 56th Annual Conference of the Society of Instrument and Control Engineers of Japan (SICE) (Year: 2017).

Research and implementation of the context-aware middleware for controlling home appliances, Jonghwa Choi; Dongkyoo Shin; Dongil Shin, IEEE Transactions on Consumer Electronics (Year: 2005).

Anwar Chitheer Jasim; Imad Ali Hassoon; Nicolae Tapus; Cloud: privacy For Locations Based-services' through Acess Control with dynamic multi-level policy, 2019 6th International Conference on Control, Decision and Information Technologies (CoDIT), Year: 2018 | Conference Paper | Publisher: IEEE (Year: 2016).

Samsung USA, "Samsung CES 2015: Inside the SmartThings Smart Home", Published Jan. 16, 2015, retrieved from https://www.youtube.com/watch?v=FTiFt9mpICE on Jan. 4, 2016.

Samsung Newsroom "Samsung Exhibition@CES 2015: IoT Walkthrough", Published Jan. 7, 2015, retreived from http://www.youtube.com/watch?v=InRKAr3vKUk on Jan. 4, 2016.

Communication dated Apr. 15, 2016, issued by the International Searching Authority in counterpart International Application No. PCT/KR2015/014556 (PCT/ISA/220, 210, 237).

Communication dated Mar. 18, 2021 issued by the Korean Intellectual Property Office in counterpart Korean Application No. 10-2015-0000290.

* cited by examiner

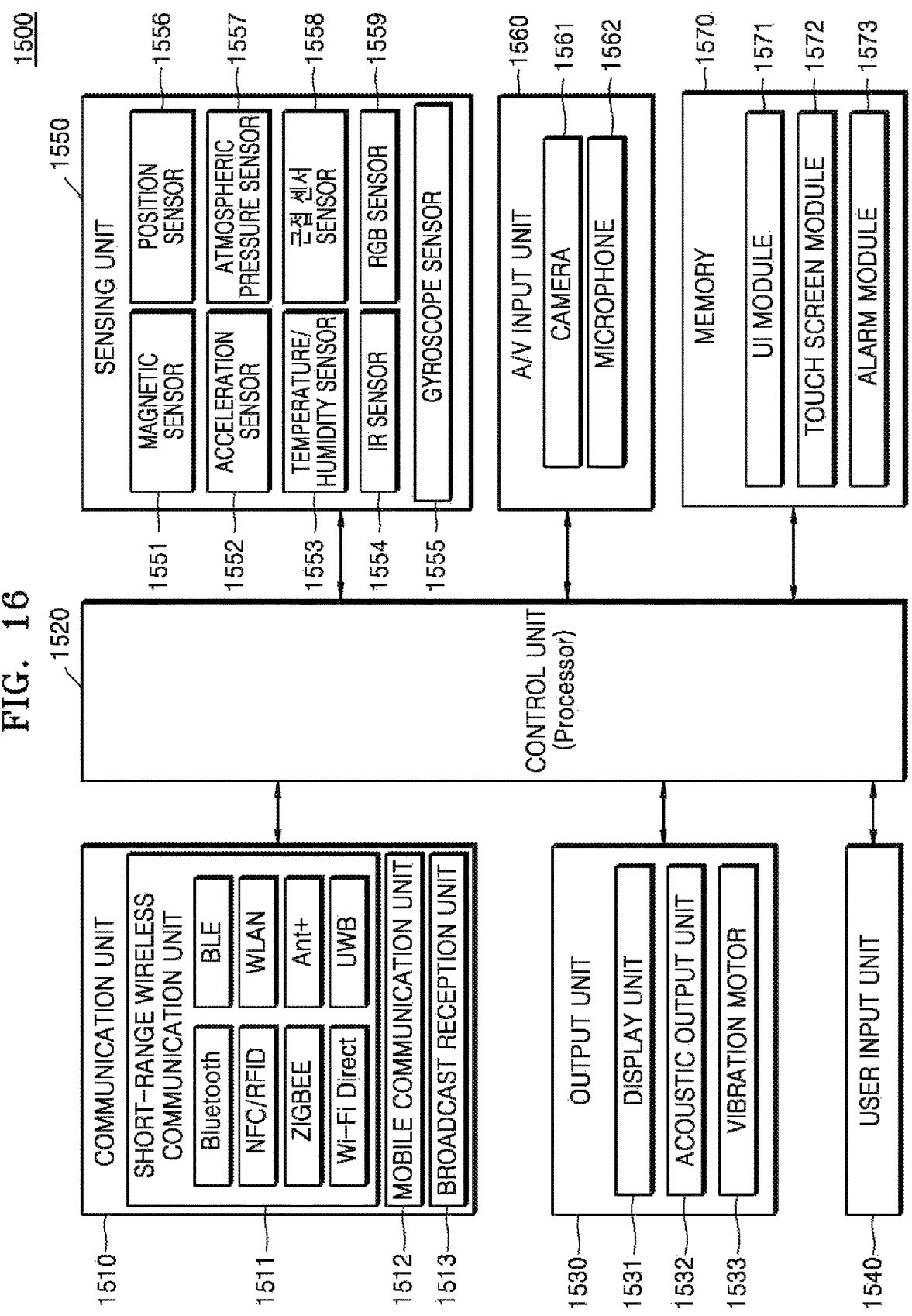

METHOD AND DEVICE FOR CONTROLLING HOME DEVICE

CROSS-REFERENCE TO RELATED APPLICATIONS

This is a continuation of U.S. patent application Ser. No. 16/297,147 filed Mar. 8, 2019, which is a continuation of U.S. patent application Ser. No. 14/987,405 filed Jan. 4, 2016, now U.S. Pat. No. 10,250,691 issued Apr. 2, 2019, which claims the benefit of U.S. Provisional Application No. 62/121,958, filed on Feb. 27, 2015, in the US Patent and Trademark Office and priority from Korean Patent Application No. 10-2015-0000290, filed on Jan. 2, 2015, in the Korean Intellectual Property Office, the disclosures of which are incorporated by reference herein in their entireties.

BACKGROUND

1. Field

Apparatuses and methods consistent with exemplary embodiments relate to a method of controlling a home device and a device for controlling a home device.

2. Description of the Related Art

Recently, along with developments in information communication technology and network technology, devices have evolved into portable multimedia devices having various functions.

Along with high-level developments in electrical and electronic technology and wired and wireless communication technology, interoperation between devices in locations distant from each other has become easier, and the types of interoperable products also have become increasingly varied. Accordingly, in the modern home residence culture, a home network is becoming mandatory rather than just optional. The home network is currently highlighted as next-generation information technology (IT) and includes a set of technologies for enhancing user convenience by being combined with the Internet, on the basis of control, management, integration, and interoperation with respect to information home appliances in a home.

SUMMARY

Provided are a method and a device for controlling a home device located at home according to circumstances of a user by using context information acquired by a mobile device to control the home device.

Additional aspects will be set forth in part in the description which follows and, in part, will be apparent from the description, or may be learned by practice of the presented exemplary embodiments.

According to an aspect of an exemplary embodiment, a method by which a server controls a home device includes: receiving a trigger signal generated by a sensor in a home in response to a mobile device being present at a specific location in the home; determining a home device corresponding to the specific location by using the trigger signal; selecting context information related to an operation of the determined home device from among context information received from the mobile device; and providing the selected context information to the home device.

According to an aspect of another exemplary embodiment, a method by which a mobile device controls a home device includes: acquiring context information of the mobile device or context information of a user; receiving, from a server in which the user of the mobile device is registered, a trigger signal generated in response to the mobile device being present at a specific location in a home; and providing the acquired context information to the server in response to the received trigger signal, wherein context information related to an operation of a home device corresponding to the specific location from among the context information provided to the server is provided from the server to the home device.

According to an aspect of another exemplary embodiment, a server for controlling a home device includes: a communicator configured to receive a trigger signal generated by a sensor in a home in response to a mobile device being present at a specific location in the home; and a controller configured to determine a home device corresponding to the specific location by using the trigger signal and to select context information related to an operation of the determined home device from among context information received from the mobile device, wherein the communicator provides the selected context information to the home device.

According to an aspect of another exemplary embodiment, a mobile device for controlling a home device includes: a communicator configured to acquire context information of the mobile device or context information of a user and to receive, from a server in which the user of the mobile device is registered, a trigger signal generated in response to the mobile device being present at a specific location in a home; and a controller configured to provide the acquired context information to the server in response to the received trigger signal, wherein context information related to an operation of a home device corresponding to the specific location from among the context information provided to the server is provided from the server to the home device.

According to an aspect of an exemplary embodiment, a method for controlling a device includes: receiving a trigger signal generated by a sensor in a building in response to a mobile device being at a specific location in the building; determining a home device corresponding to the specific location; selecting context information usable to control an operation of the determined home device from among context information of the mobile device; and controlling the home device based on the selected context information.

BRIEF DESCRIPTION OF THE DRAWINGS

These and/or other aspects will become apparent and more readily appreciated from the following description of the exemplary embodiments, taken in conjunction with the accompanying drawings in which:

FIGS. 15 and 16 illustrate block diagrams for describing a configuration of a mobile device, according to an exemplary embodiment.

DETAILED DESCRIPTION OF EXEMPLARY EMBODIMENTS

Figure 1:
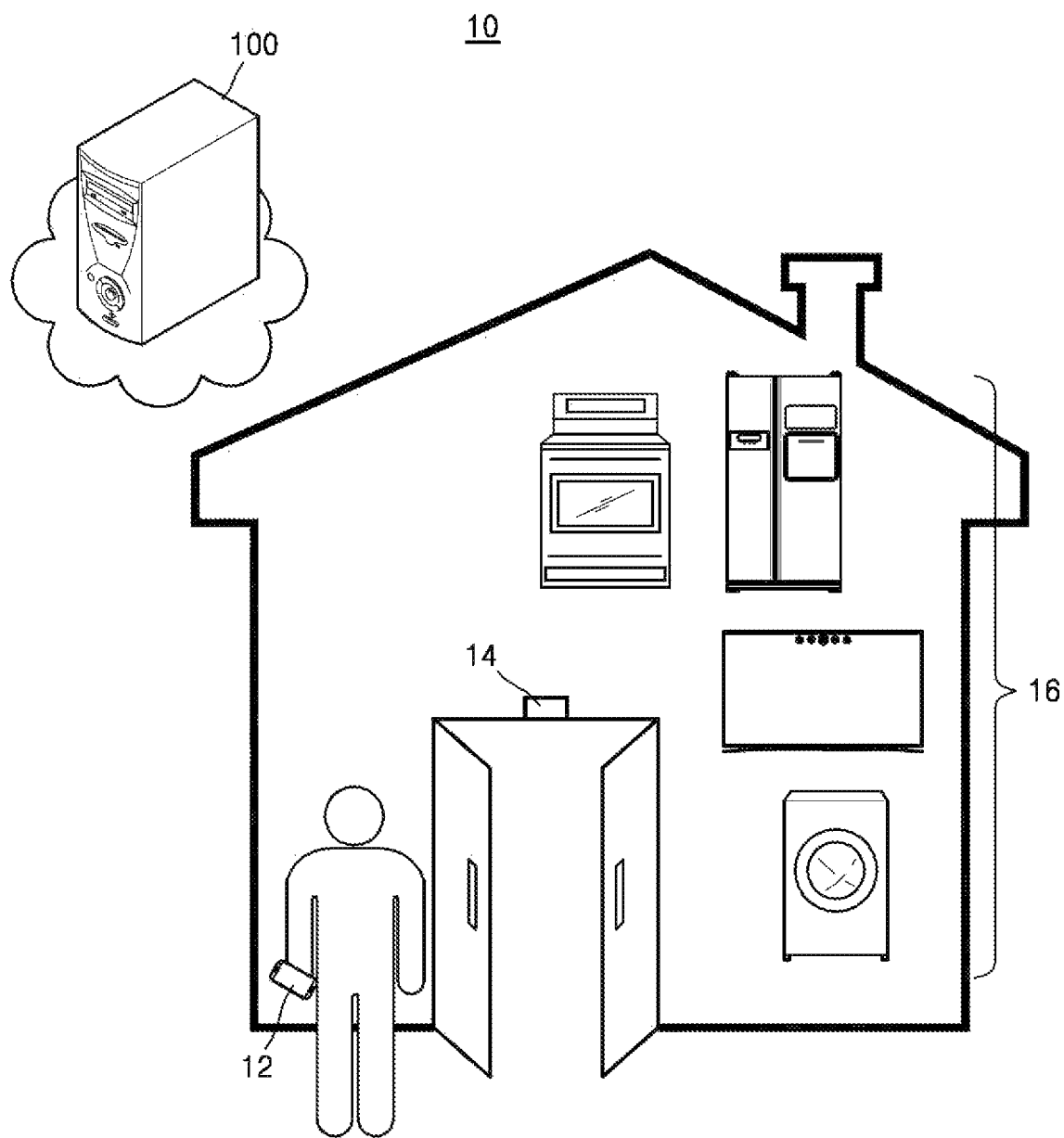
FIG. 1 illustrates a conceptual diagram for describing a system for controlling home devices, according to an exemplary embodiment.

Reference will now be made in detail to exemplary embodiments, which are illustrated in the accompanying drawings, wherein like reference numerals refer to like elements throughout. In this regard, the exemplary embodiments may have different forms and should not be construed as being limited to the descriptions set forth herein. Accordingly, the exemplary embodiments are merely described below, by referring to the figures, to explain aspects of the exemplary embodiments.

In the specification, when it is described that a certain part is 'connected' to another part, it should be understood that the certain part may be "directly connected" to another part or "electrically connected" to another part via a third part in the middle. In addition, when a certain part "includes" a certain component, this indicates that the part may further include another component instead of excluding another component unless there is different disclosure.

As used herein, the term "and/or" includes any and all combinations of one or more of the associated listed items. Expressions such as "at least one of," when preceding a list of elements, modify the entire list of elements and do not modify the individual elements of the list.

In the specification, the term "home device" indicates a home appliance designed for a specific purpose in a home. For example, a TV, an air conditioner, a washing machine, a cleaner, a microwave oven, a refrigerator, or the like may be included as the home device, but the home device is not limited thereto. The home device may be controlled through a wired and wireless electric communication network by being equipped with a wired and wireless network function so as to enable transmission and reception of analog and digital information.

In addition, the term "context information" may include information related to a situation of a user who uses a mobile device. The context information may be used to predict a situation of the user. The context information may include context information related to the mobile device and context information related to the user. The context information related to the mobile device may include, for example, information regarding a device location, time, weather, and an execution history of applications executed by the mobile device. In addition, the context information related to the user may include, for example, information regarding an activity history of the user, events, lifestyle, a consumption list, a schedule, and preferences of the user.

In one exemplary embodiment, the context information may include fitness information such as heart rate, galvanic skin response, and other fitness information. The fitness information may be used to control an operation of a thermostat, fitness equipment, etc. In another exemplary embodiment, the context information may include context information on more than one user or more than one mobile device. The context information on more than one user or more than one mobile device may be used to control one or more home devices according to the context information on more than one user or more than one mobile device.

However, the description above is only illustrative, and the context information is not limited thereto.

Hereinafter, exemplary embodiments of the inventive concept will be described in detail with reference to the accompanying drawings.

FIG. 1 illustrates a conceptual diagram for describing a system 10 for controlling home devices 16, according to an exemplary embodiment of the inventive concept.

Referring to FIG. 1, the system 10 for controlling the home devices 16 may include a server 100, a mobile device 12, a sensor 14, and the home devices 16.

The system 10 for controlling the home devices 16, which is shown in FIG. 1, includes only components related to the present exemplary embodiment. Therefore, it will be understood by those of ordinary skill in the art related to the present exemplary embodiment that other general-use components may be further included in addition to or in place of the components shown in FIG. 1.

The server 100 may communicate with the home devices 16 located in the home. The server 100 may receive respective identification values of the home devices 16 from the home devices 16. For example, the server 100 may receive respective serial code numbers of the home devices 16.

The server 100 may store the identification values received from the home devices 16. In addition, the server 100 may store identification information of a user who uses the home devices 16 together with the identification values of the home devices 16. For example, if the user has subscribed to a website provided by the server 100, the server 100 may store an identification (ID) and a password of the user for the website as the identification information of the user. Alternatively, the server 100 may store, as the identification information of the user, a media access control (MAC) address of the mobile device 12 which the user uses.

In addition, the server 100 may communicate with the mobile device 12. The server 100 may request the mobile device 12 for information required to control the home devices 16. For example, the server 100 may request the mobile device 12 for context information. In addition, the server 100 may transmit the context information received from the mobile device 12 to the home devices 16. Herein, the context information may be used to determine an operation to be performed by at least one of the home devices 16.

When the server 100 receives a trigger signal generated by the sensor 14 in the home, the server 100 may request the mobile device 12 for context information. The trigger signal may be generated by the sensor 14 provided at a specific location in the home, when the user is located at the specific location. The trigger signal may include identification values of the home devices 16 located at the specific location in the home.

The server 100 requesting the mobile device 12 for context information is only illustrative, and the server 100 may receive the context information from the mobile device 12 during a preset period.

The mobile device 12 may acquire context information of the user or the mobile device 12. According to one exemplary embodiment, the mobile device 12 may transmit the context information to the server 100 in response to a context information request received from the server 100. As another example, the mobile device 12 may transmit the context information to the server 100 during a preset period.

The home devices 16 may determine an operation to be performed by using the context information received from the server 100. For example, for a TV, the server 100 may determine an operation to be actually performed among available operations of the TV, such as an operation of displaying the context information on a screen, an operation of providing an alarm at a set time, and the like, by using the received context information.

According to another exemplary embodiment, the server 100 receives the trigger signal generated by a sensor in a building in response to the mobile device 12 being at a specific location in the building. The server 100 determines a home device 16 corresponding to the specific location. The server 100 selects context information usable to control an operation of the determined home device 16 from among context information of the mobile device 12. The server 100 controls the home device 16 based on the selected context information.

Figure 2:
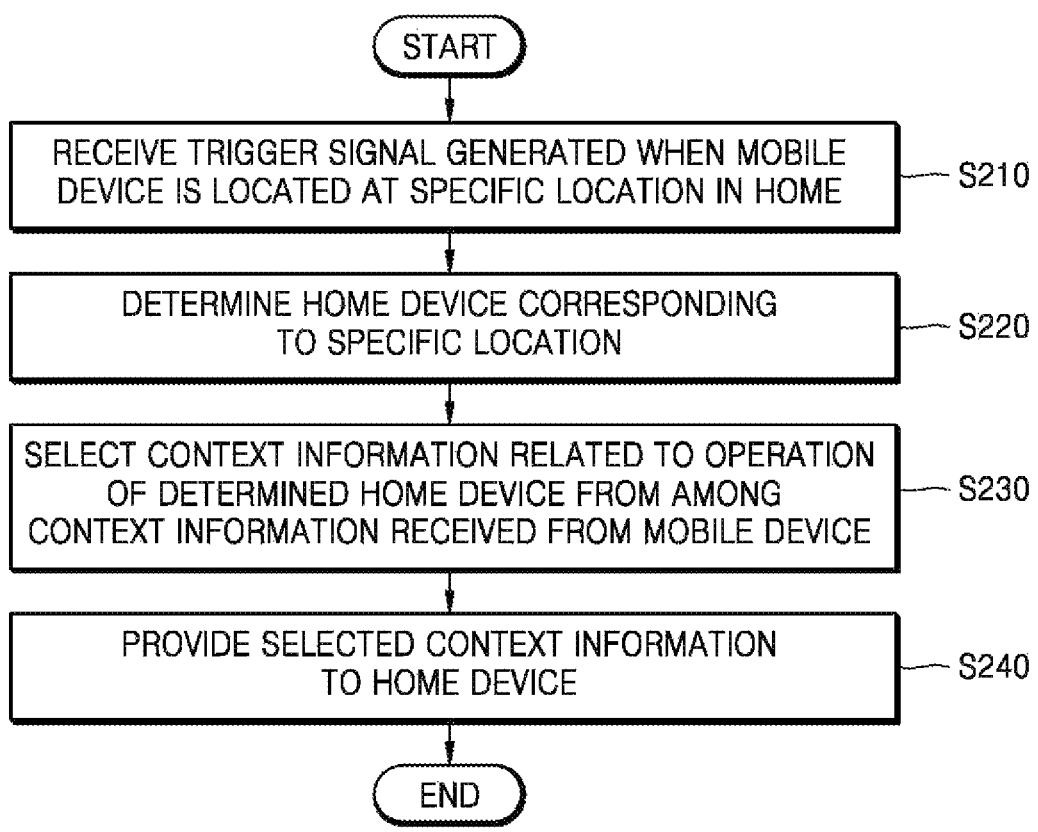
FIG. 2 illustrates a flowchart for describing a method by which a server controls a home device, according to an exemplary embodiment.

FIG. 2 illustrates a flowchart for describing a method by which the server 100 controls a home device 16, according to an exemplary embodiment of the inventive concept.

In operation S210, the server 100 receives a trigger signal generated by a sensor 14 in the home when a mobile device 12 is located at a specific location in the home.

At least one sensor may be provided for each specific location in the home. For example, sensors may be respectively provided to bedrooms, a multipurpose room, a bathroom, a kitchen, an entrance, and a living room in the home. The sensor 14 may detect the mobile device 12 located near a location where the sensor 14 is provided. For example, a sensor 14 provided at the entrance may detect the mobile device 12 when a user carrying the mobile device 12 passes through the entrance. A range in which the sensor 14 detects the mobile device 12 may be determined according to settings by the user. For example, the user may set detection ranges of the at least one sensor provided in the home such that the detection ranges do not overlap each other.

The server 100 may identify trigger signals generated by different sensors. The trigger signals generated by the different sensors may have different waveforms and strengths thereof and different information included therein. Information included in a trigger signal may include a location information code indicating a location where a sensor is located and identification values of home devices located around the sensor. For example, a trigger signal generated by a sensor provided in a multipurpose room of an apartment A building B No. C may include a location information code indicating the multipurpose room of the apartment A building B No. C and an identification value of a washing machine located in the multipurpose room. In addition, a trigger signal generated by a sensor provided in a living room of the apartment A building B No. C may include a location information code indicating the living room of the apartment A building B No. C and an identification value of a TV located in the living room.

In operation S220, the server 100 determines a home device 16 corresponding to the specific location by using the trigger signal.

As described above, the trigger signal may include identification values of home devices 16 located around the sensor 14 which has generated the trigger signal. The server 100 may extract the identification values of the home devices 16 located around the sensor 14 from the trigger signal. The server 100 may compare pre-stored identification values of home devices 16 with the extracted identification values of the home devices 16 to specify the home devices 16 located around the sensor 14.

In operation S230, the server 100 selects context information related to an operation of the determined home device 16 from among context information received from the mobile device 12.

According to an exemplary embodiment, when the server 100 receives a trigger signal, the server 100 may request the mobile device 12 for context information. The server 100 may receive the context information from the mobile device 12 as a response to the request. According to another exemplary embodiment, the server 100 may receive the context information from the mobile device 12 during a preset period.

The server 100 may previously store keywords for identifying context information related to operations of home devices 16. The keywords may indicate information regarding conditions supposed to be satisfied to determine operations to be performed by the home devices 16. For example, the keywords may include a word indicating a condition for performing any one of available operations of the home devices 16, a type of an application to be executed by the mobile device 12, and the like. In detail, the server 100 may select, as keywords related to a TV, words such as play, video, a favorite broadcast program list, photograph, travel schedule, and the like. Alternatively, a video playback application, a Digital Multimedia Broadcasting (DMB) application, a scheduler application, and the like may be selected as keywords related to the TV.

The server 100 may select context information required to determine an operation to be performed by the determined home device 16 from among the received context information by using the pre-stored keywords. For example, the server 100 may select context information including words such as play, video, a favorite broadcast program list, photograph, travel schedule, and the like, which are keywords related to the TV, from among the received context information.

Keywords of the home devices 16 may be set differently for each of the home devices 16.

In operation S240, the server 100 provides the selected context information to the determined home device 16. For example, the server 100 may transmit context information to the determined home device 16. As another example, the server 100 may transmit, to the determined home device 16, link information by which context information is downloaded. A method by which the server 100 transmits link information to the determined home device 16 will be described in detail below with reference to FIGS. 9 and 10.

The home device 16 may determine an operation to be performed by using the provided context information. For example, a TV may determine whether to perform a display operation or an alarm operation by using the provided context information. The TV may also determine a type of information to be displayed by using the context information. A method by which the TV performs an operation by using the provided context information will be described in detail below with reference to FIG. 4.

Figure 3:
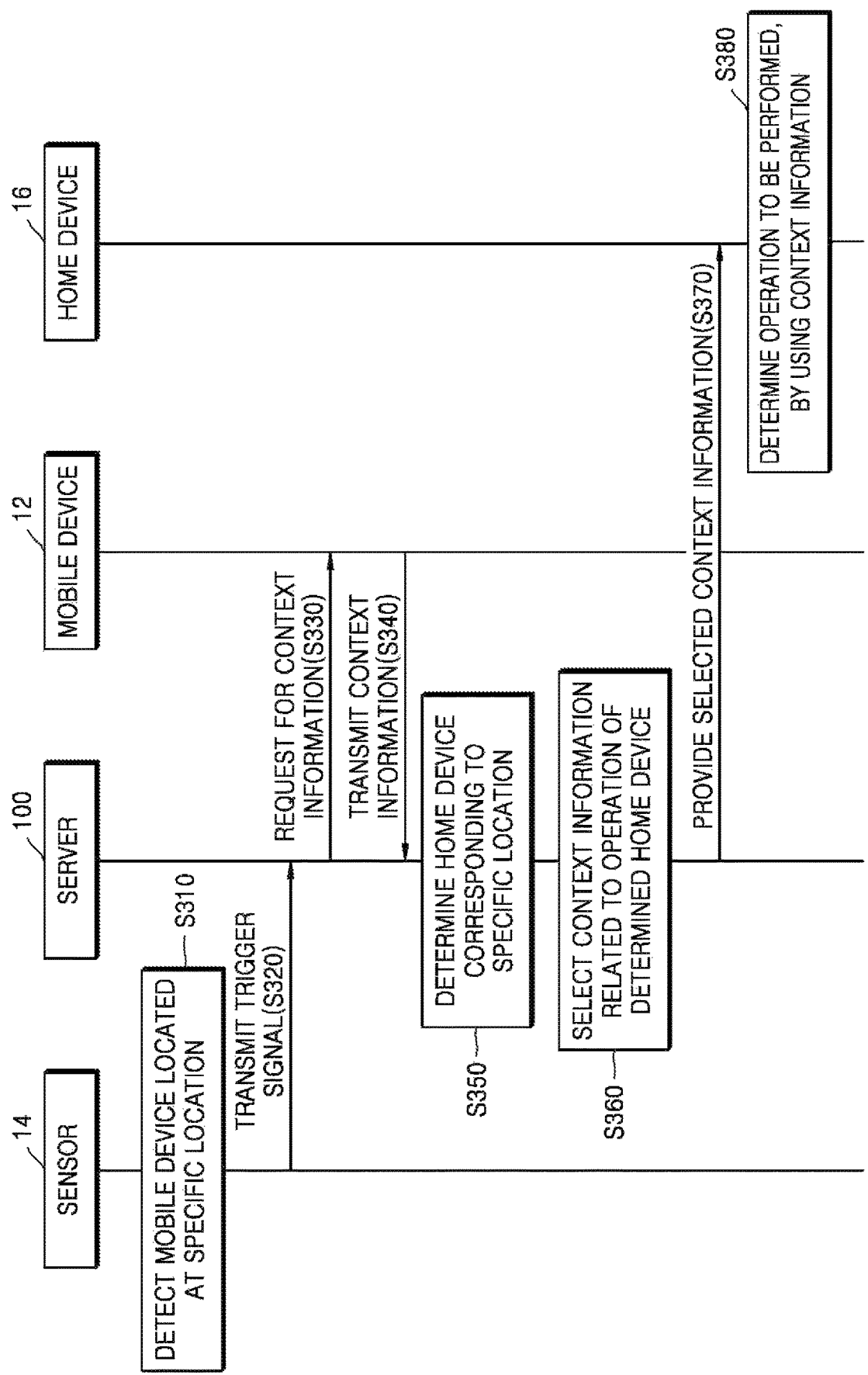
FIG. 3 illustrates an operation flow diagram for describing in detail a system for controlling a home device, according to an exemplary embodiment.

FIG. 3 illustrates an operation flow diagram for describing in detail the system 10 for controlling a home device 16, according to an exemplary embodiment of the inventive concept.

In operation S310, a sensor 14 detects a mobile device 12 located at a specific location. According to an exemplary embodiment, the sensor 14 may detect the mobile device 12 where the sensor 14 is located. For example, a sensor provided at the entrance may detect the mobile device 12 when the user carrying the mobile device 12 passes through the entrance. As another example, a sensor provided in a room may detect the mobile device 12 when the user carrying the mobile device 12 is located in a distance range within 1 m from the room.

According to another exemplary embodiment, the sensor 14 may determine whether the detected mobile device 12 is an authorized mobile device by using an identification value of the mobile device 12. If the identification value of the mobile device 12 is not registered, the sensor 14 may not detect the mobile device 12.

In operation S320, the sensor 14 transmits a trigger signal to the server 100 when the mobile device 12 is detected. The sensor 14 may generate the trigger signal when the mobile device 12 is detected. The trigger signal may include information on home devices 16 located around the sensor 14. For example, the trigger signal may include serial code numbers of the home devices 16 located around the sensor 14.

Alternatively, an identification number of the sensor 14, which generates the trigger signal, or location information of the sensor 14 may be included in the trigger signal together with the information on the home devices 16. For example, a header of a trigger signal may include information indicating a sensor in room 1 of an apartment A building B No. C, and a payload may include serial code numbers of home devices, such as a lighting fixture, a cleaner, an audio system, and the like, located in room 1 of apartment A building B No. C.

The sensor 14 may transmit the generated trigger signal to the server 100.

In operation S330, the server 100 requests the mobile device 12 for context information according to the reception of the trigger signal.

The server 100 may previously store identification information of at least one user using the home devices 16 in the home, an identification value of the mobile device 12 of the user, and the like. For example, the identification information of the user may include address information of the user. When the user has subscribed to a website provided by the server 100, the identification information of the user may include an ID and a password of the user in addition to the address information of the user. The server 100 may store identification values of the home devices 16 located in the home together with the above-described identification information of the user and the identification value of the mobile device 12 of the user.

The server 100 may determine a mobile device from which context information is to be requested by using a trigger signal. The server 100 may determine a mobile device from which context information is to be requested by comparing identification information of a user or an identification value of a mobile device of the user, which is included in a received trigger signal, with identification information of at least one user or an identification value of a mobile device of the at least one user, which is stored in a database.

The server 100 may request the determined mobile device for context information.

In operation S340, the mobile device 12 transmits the context information to the server 100 in response to the request.

The context information stored in the mobile device 12 may include information related to a situation of the user who uses the mobile device 12. The mobile device 12 may predict the situation of the user through the context information. The context information includes information regarding a location of the mobile device 12, a time, weather, and an execution history of applications executed by the mobile device 12. In addition, the context information may include information regarding an activity history of the user, lifestyle, a consumption list, a schedule, and preferences of the user.

In operation S350, the server 100 determines a home device 16 corresponding to the specific location.

As described above, the trigger signal may include information on home devices 16 located around the sensor 14 which has generated the trigger signal. The server 100 may extract identification values of the home devices 16 located around the sensor 14 from the trigger signal. The server 100 may compare pre-stored identification values of home devices 16 with the extracted identification values of the home devices 16 to specify the home devices 16 located around the sensor 14.

For example, the server 100 may confirm that a TV is located near a sensor which has generated a trigger signal, by using an identification value of the TV, which is included in the trigger signal.

Operation S350 may correspond to operation S220 described above with reference to FIG. 2.

In operation S360, the server 100 selects context information related to an operation of the determined home device 16.

The server 100 may previously store keywords by which context information related to operations of home devices 16 is identified. The server 100 may select context information required to determine the operation to be performed by the determined home device 16 from among received context information by using the pre-stored keywords.

For example, context information received by the server 100 may include information regarding a title of a broadcast program which a user was watching before entering the home and a play position of the broadcast program. The server 100 may select context information related to the broadcast program which the user has watched, by using the words play, broadcast program, DMB application, and the like, which are keywords related to a TV. However, this example is only illustrative, and the keywords in the present exemplary embodiment are not limited thereto.

The keywords pre-stored in the server 100 may differ for each home device 16.

Operation S360 in FIG. 3 may correspond to operation S230 described above with reference to FIG. 2.

In operation S370, the server 100 provides the selected context information to the determined home device 16.

The server 100 may transmit the selected context information to the determined home device 16. According to another exemplary embodiment, when the server 100 separately stores context information in a data storage server, the server 100 may transmit link information so that the determined home device 16 downloads the selected context information from the data storage server.

In operation S380, the home device 16 determines an operation to be performed by the home device 16 by using the selected context information. For example, when a TV receives, from the server 100, context information related to a broadcast program which the user has watched, the TV may perform a display operation of the TV so as to play the broadcast program from a frame immediately after the frame which the user has watched or to play the broadcast program from a point in time corresponding a point in time in the program that the user has left off at or completed watching.

Figure 4:
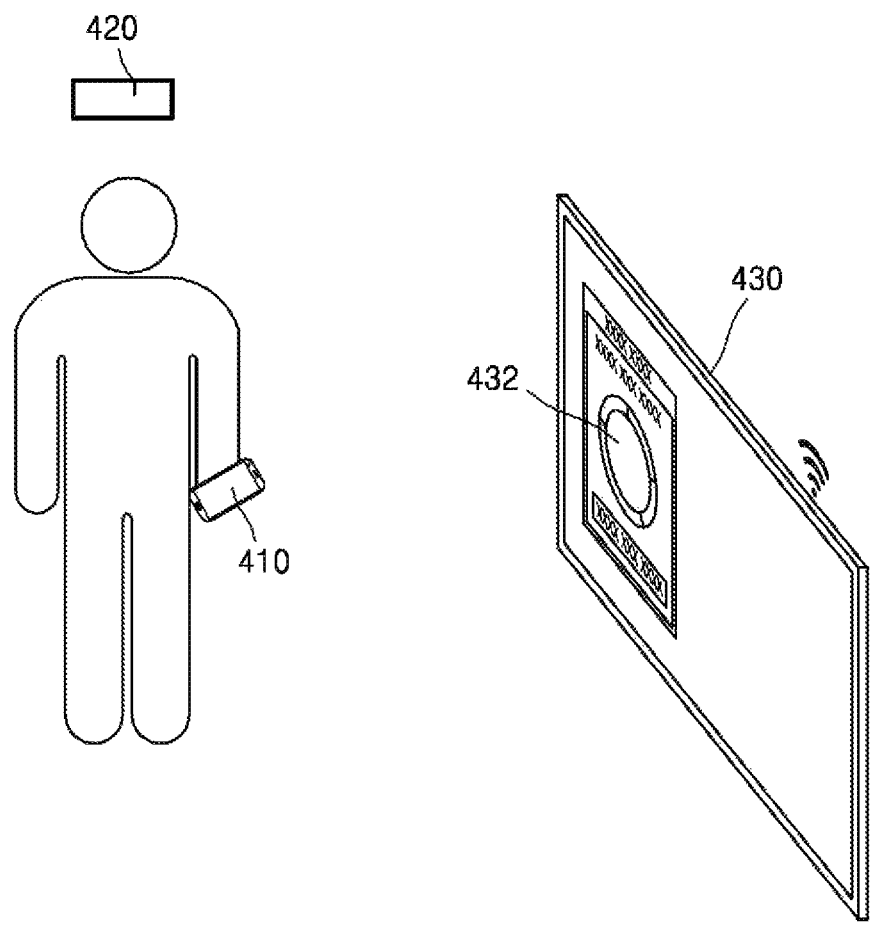
FIG. 4 illustrates a conceptual diagram for describing a method by which a server controls a TV, according to an exemplary embodiment.

FIG. 4 illustrates a conceptual diagram for describing a method by which the server 100 controls a TV 430, according to an exemplary embodiment of the inventive concept.

Referring to FIG. 4, when a user who carries a mobile device 410 enters a living room where the TV 430 is located, a sensor 420 located around the TV 430 may detect the mobile device 410 of the user. When the sensor 420 detects the mobile device 410, the sensor 420 may generate a trigger signal and transmit the generated trigger signal to the server 100.

The server 100 may receive the trigger signal from the sensor 420. The server 100 may request the mobile device 410 for context information by using the received trigger signal. The server 100 may extract identification information of the user or an identification value of the mobile device 410 of the user from the trigger signal. The server 100 may determine the mobile device 410 by comparing the extracted identification information of the user or the extracted identification value of the mobile device 410 of the user with identification information of users of a plurality of mobile devices or identification values of the plurality of mobile devices, which are stored in the database of the server 100.

The server 100 may request the determined mobile device 410 for context information. The server 100 may receive the context information from the mobile device 410 in response to the context information request.

The server 100 may confirm that a home device located in the living room is the TV 430, by using an identification value of the TV 430, which is included in the trigger signal.

The server 100 may select context information related to an operation of the TV 430 from among the received context information by using pre-stored keywords related to the TV 430.

For example, the server 100 may select, as the context information related to an operation of the TV 430, traveling days, information on people who have travelled together, a route travelled by the user, places which the user visited during travel, and photographed pictures from among the received context information by using the word "travel" that is a keyword related to the TV 430.

The server 100 may transmit the selected context information to the TV 430.

The TV 430 may receive the context information from the server 100. The TV 430 may perform an operation determined to be required for the user according to a situation of the user, which is determined on the basis of the received context information, from among available operations. The TV 430 may include a database for storing the available operations respectively matched with related context information. For example, the database may store information indicating that an operation of generating and displaying a video album should be performed when information on a photograph file, a place, a date, and a route is received.

According to the above-described example, the TV 430 may generate a video album related to the travel by mapping visited places to photograph information. The TV 430 may display the generated video album.

In addition, when the TV 430 receives information on other people who have travelled together with the user, the TV 430 may share the generated video album with the other people.

As another example, the server 100 may select, as the context information related to an operation of the TV 430, an exercise type, an exercising time, biometric signal information of the user, which has been measured during an exercise, and the like from among the received context information by using the word "exercise" that is a keyword related to the TV 430.

The server 100 may transmit the selected context information to the TV 430.

The TV 430 may receive the context information from the server 100. When information regarding an exercise is received, the database of the TV 430 may store information indicating that an operation of calculating calorie consumption details of the user and displaying the calorie consumption details based on an exercising time should be performed.

The TV 430 may display information on calories consumed during the exercise of the user based on an exercising time by using the received exercise type, exercising time, and biometric signal information of the user, which has been measured while exercising.

As another example, the server 100 may select, as the context information related to an operation of the TV 430, information regarding a place the user regularly visits, information regarding a time the user usually visits the place, and the like by using "schedule" that is a keyword related to the TV 430.

The server 100 may transmit the selected context information to the TV 430.

The TV 430 may receive the context information from the server 100. When information regarding places the user regularly visits and information regarding times the user visits the places are received, the database of the TV 430 may store information indicating that an operation of determining a place to be recommended to the user and displaying the determined place should be performed.

The TV 430 may determine and display a place preferred by the user by using the received information regarding places which the user regularly visits and information regarding the times the user has visited the places.

Figure 5:
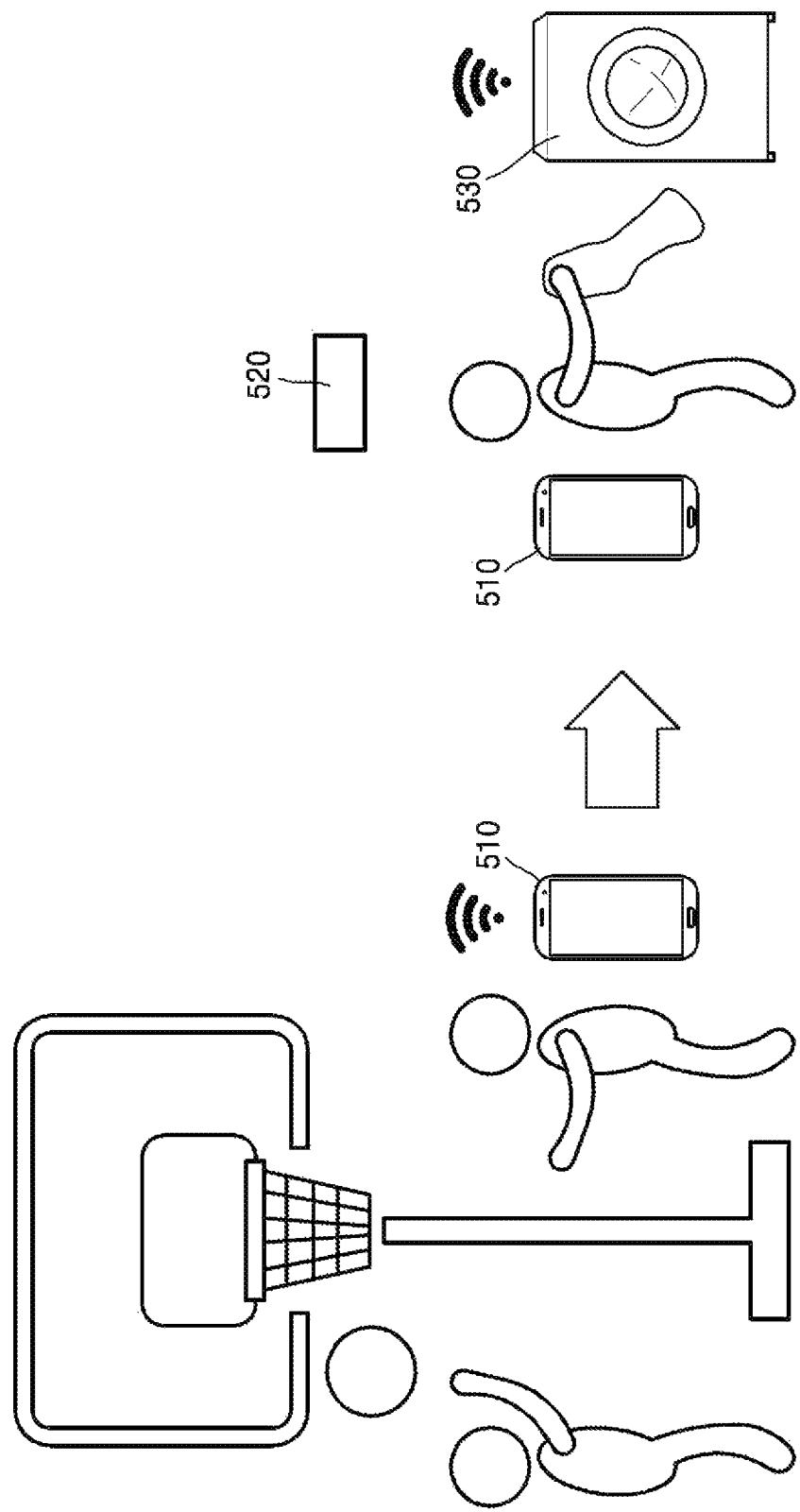
FIG. 5 illustrates a conceptual diagram for describing a method by which a server controls a washing machine, according to an exemplary embodiment.

FIG. 5 illustrates a conceptual diagram for describing a method by which the server 100 controls a washing machine 530, according to an exemplary embodiment of the inventive concept.

Referring to FIG. 5, when a user carrying a mobile device 510 enters a multipurpose room where the washing machine 530 is located, a sensor 520 located near the washing machine 530 may detect the mobile device 510 of the user. When the sensor 520 detects the mobile device 510, the sensor 520 may generate a trigger signal and transmit the generated trigger signal to the server 100.

The server 100 may receive the trigger signal from the sensor 520. The server 100 may request the mobile device 510 for context information by using the received trigger signal. The server 100 may extract identification information of the user or an identification value of the mobile device 510 of the user from the trigger signal. The server 100 may determine the mobile device 510 by comparing the extracted identification information of the user or the extracted identification value of the mobile device 510 of the user with identification information of users of a plurality of mobile devices or identification values of the plurality of mobile devices, which are stored in the database of the server 100.

The server 100 may request the determined mobile device 510 for context information. The server 100 may receive the context information from the mobile device 510 in response to the context information request.

The server 100 may confirm that a home device located in the multipurpose room is the washing machine 530, by using an identification value of the washing machine 530, which is included in the trigger signal.

The server 100 may select context information related to an operation of the washing machine 530 from among the received context information by using pre-stored keywords related to the washing machine 530.

For example, the server 100 may select, as the context information related to an operation of the washing machine 530, a sport type, a playing time, biometric signal information of the user, which has been measured during a sport game, and the like from among the received context information by using the word "sport" that is a keyword related to the washing machine 530.

The server 100 may transmit the selected context information to the washing machine 530.

The washing machine 530 may receive the context information from the server 100. When information regarding a sport is received, a database of the washing machine 530 may store information indicating that an operation of cleaning sportswear worn by the user during the sport should be performed.

The washing machine 530 may perform an operation for cleaning the sportswear according to the received context information.

Figure 6:
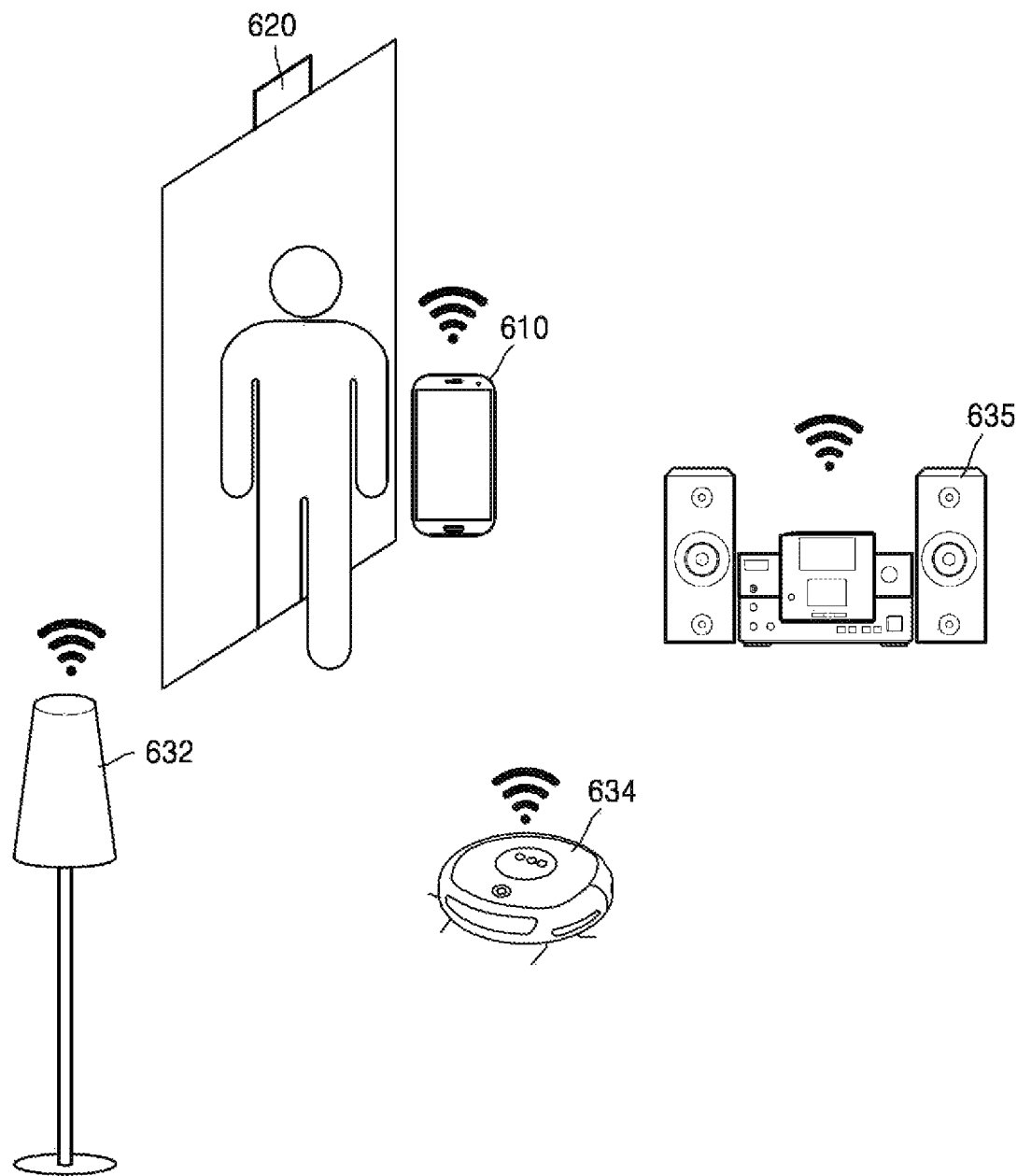
FIG. 6 illustrates a conceptual diagram for describing a method by which a server controls home devices located in a room, according to an exemplary embodiment.

FIG. 6 illustrates a conceptual diagram for describing a method by which the server 100 controls home devices 632, 634, and 635 located in a room, according to an exemplary embodiment of the inventive concept.

Referring to FIG. 6, when a user carrying a mobile device 610 enters the room, a sensor 620 located in the room may detect the mobile device 610 of the user. When the sensor 620 detects the mobile device 610, the sensor 620 may generate a trigger signal and transmit the generated trigger signal to the server 100.

The server 100 may receive the trigger signal from the sensor 620. The server 100 may request the mobile device 610 for context information by using the received trigger signal. The server 100 may extract identification information of the user or an identification value of the mobile device 610 of the user from the trigger signal. The server 100 may determine the mobile device 610 by comparing the extracted identification information of the user or the extracted identification value of the mobile device 610 of the user with identification information of users of a plurality of mobile devices or identification values of the plurality of mobile devices, which are stored in the database of the server 100.

The server 100 may request the determined mobile device 610 for context information. The server 100 may receive the context information from the mobile device 610 in response to the context information request.

Referring to FIG. 6, a lighting fixture 632, a robot cleaner 634, and an audio system 635 may be located in the room.

The server 100 may confirm that home devices located in the room are the lighting fixture 632, the robot cleaner 634, and the audio system 635, by using identification values of the lighting fixture 632, the robot cleaner 634, and the audio system 635, which are included in the received trigger signal.

The server 100 may select context information related to operations of the lighting fixture 632, the robot cleaner 634, and the audio system 635 from among the received context information by using pre-stored keywords respectively related to the lighting fixture 632, the robot cleaner 634, and the audio system 635.

For example, the server 100 may select, as the context information related to an operation of the lighting fixture 632, information by which a feeling, an emotion, and the like are predictable from among the received context information by using "feeling," "emotion," and the like that are keywords related to the lighting fixture 632.

The server 100 may transmit the selected context information to a device for controlling the lighting fixture 632.

The device for controlling the lighting fixture 632 may receive the context information from the server 100. A database of the device for controlling the lighting fixture 632 may store information indicating that the brightness of the lighting fixture 632 should be adjusted by determining a feeling and an emotion of the user when information regarding the feeling and the emotion of the user is received.

The device for controlling the lighting fixture 632 may determine the brightness of the lighting fixture 632 by predicting a feeling and an emotion of the user according to the received context information.

As another example, the server 100 may select, as the context information, information regarding a title of a played music file and a play position of the music file from among the received context information by using "music play" and "an execution history of a music play application" that are keywords related to the audio system 635.

The server 100 may transmit the selected context information to the audio system 635.

The audio system 635 may receive the context information from the server 100. A database of the audio system 635 may store information indicating that an operation of playing the latest music file from a paused position should be performed when the information regarding the title of the played music file and the play position of the music file is received The audio system 635 may play the latest music file played in the mobile device 610 from the play-paused time point according to the received context information. In other words, the audio system 635 may receive information regarding a point time where the audio system is to resume playing a music file, podcast, audiobook, etc. that is played on the mobile device 610 or other device.

Figure 7:
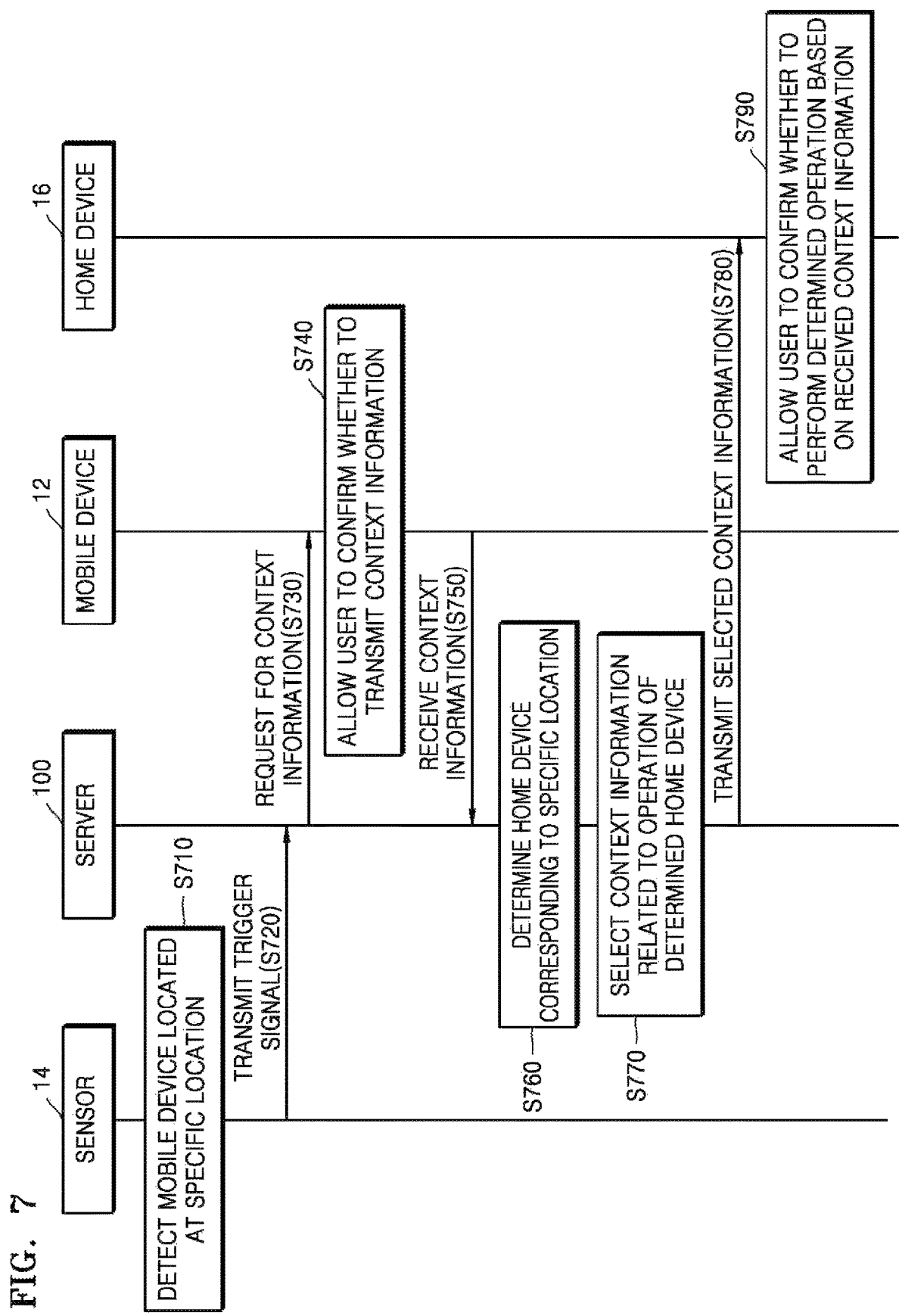
FIG. 7 illustrates an operation flow diagram for describing in detail a system for controlling a home device, according to another exemplary embodiment.

FIG. 7 illustrates an operation flow diagram for describing in detail the system 10 for controlling a home device 16, according to another exemplary embodiment of the inventive concept.

In operation S710, a sensor 14 detects a mobile device 12 located at a specific location. According to an exemplary embodiment, the sensor 14 may detect the mobile device 12 located where the sensor 14 is located.

Operation S710 may correspond to operation S310 described above with reference to FIG. 3.

In operation S720, the sensor 14 transmits a trigger signal to the server 100 when the mobile device 12 is detected. The sensor 14 may generate the trigger signal when the mobile device 12 is detected. The trigger signal may include information on home devices 16 located around the sensor 14. Alternatively, an identification number of the sensor 14, which generates the trigger signal, or location information of the sensor 14 may be included in the trigger signal together with the information on the home devices 16.

Operation S720 may correspond to operation S320 described above with reference to FIG. 3.

In operation S730, the server 100 requests the mobile device 12 for context information according to the reception of the trigger signal.

The server 100 may determine a mobile device from which context information is to be requested by using a trigger signal. The server 100 may determine a mobile device from which context information is to be requested by comparing identification information of a user or an identification value of a mobile device of the user, which is included in a received trigger signal, with identification information of at least one user or an identification value of a mobile device of the at least one user, which is stored in a database.

Operation S730 may correspond to operation S330 described above with reference to FIG. 3.

In operation S740, the mobile device 12 allows the user to confirm whether the context information is transmitted to the server 100.

According to an exemplary embodiment, the mobile device 12 may display a window for checking whether to transmit context information when a context information request is received from the server 100. The user may input, into the window, a user input indicating whether to transmit context information.

If the user inputs a user input indicating a transmission approval of context information, the mobile device 12 may detect context information stored therein. Otherwise, if the user inputs a user input indicating a transmission reject of context information, the mobile device 12 may transmit the user input to the server 100.

In operation S750, the mobile device 12 transmits the context information to the server 100 in response to the request. If the user accepts the transmission of the context information, the mobile device 12 may transmit the stored context information to the server 100.

Operation S750 may correspond to operation S340 described above with reference to FIG. 3.

In operation S760, the server 100 determines a home device 16 corresponding to the specific location.

As described above, the trigger signal may include information on home devices 16 located around the sensor 14 which has generated the trigger signal. The server 100 may extract identification values of the home devices 16 located around the sensor 14 from the trigger signal. The server 100 may compare pre-stored identification values of home devices 16 with the extracted identification values of the home devices 16 to specify the home devices 16 located around the sensor 14.

Operation S760 may correspond to operation S350 described above with reference to FIG. 3.

In operation S770, the server 100 selects context information related to an operation of the determined home device 16.

The server 100 may previously store keywords by which context information related to operations of home devices 16 is identified. The server 100 may select context information required to determine the operation to be performed by the determined home device 16 from among received context information by using the pre-stored keywords.

Operation S770 in FIG. 7 may correspond to operation S360 described above with reference to FIG. 3.

In operation S780, the server 100 provides the selected context information to the determined home device 16.

Operation S780 in FIG. 7 may correspond to operation S370 described above with reference to FIG. 3.

In operation S790, the home device 16 allows the user to confirm whether to perform a determined operation by using the selected context information.

According to an exemplary embodiment, the home device 16 may determine an operation to be performed by the home device 16 by using the selected context information. The home device 16 may output a signal for asking the user to perform the determined operation. For example, a TV may output, one a screen, a window for asking the user about whether to perform an operation of displaying a video program. As another example, an audio system may output a voice guide signal for asking the user about whether to perform an operation of playing a music file.

Figure 8:
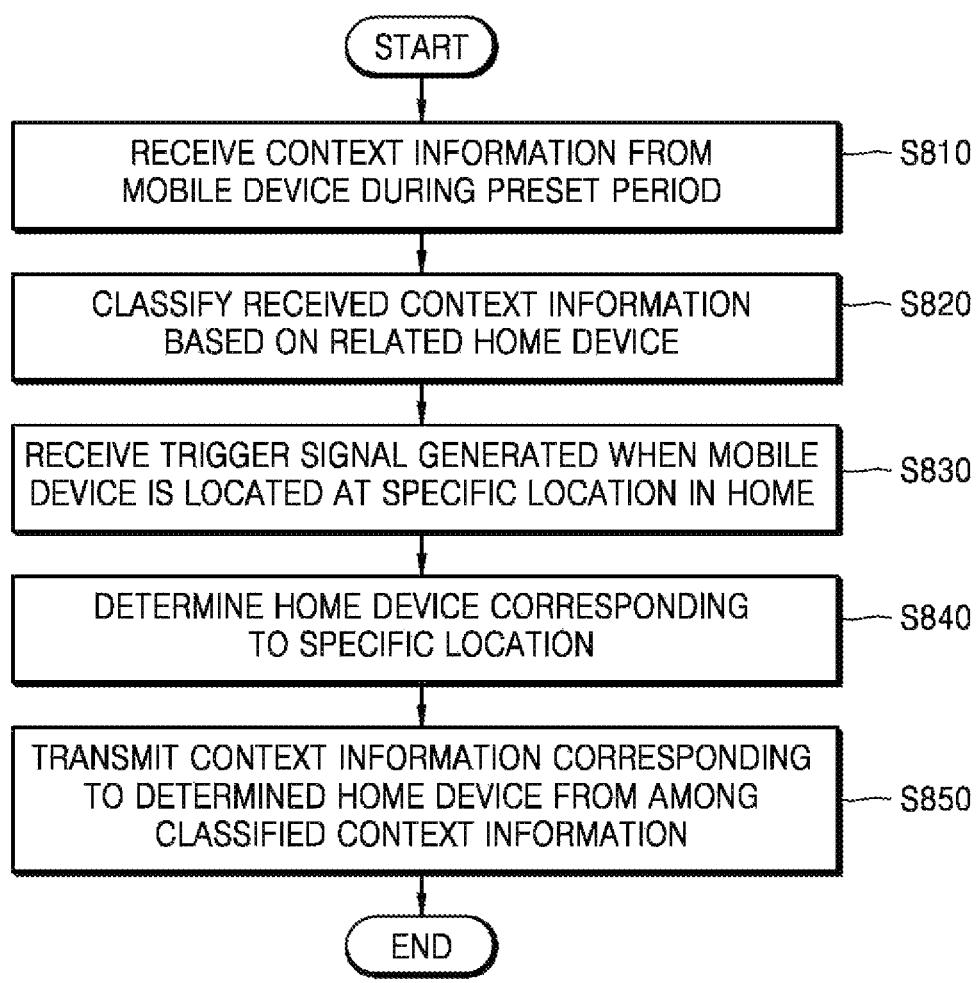
FIG. 8 illustrates a flowchart for describing a method by which a server receives context information from a mobile device, according to another exemplary embodiment.

FIG. 8 illustrates a flowchart for describing a method by which the server 100 receives context information from a mobile device 12, according to another exemplary embodiment of the inventive concept.

In operation S810, the server 100 receives context information from the mobile device 12 during a preset period.

According to an exemplary embodiment, the mobile device 12 may acquire context information related to the mobile device 12 and context information related to a user, which are used to predict a situation of the user. The server 100 may receive the context information acquired by the mobile device 12, in a preset time interval. For example, the server 100 may receive context information from the mobile device 12 during a period of one hour.

As another example, the server 100 may receive context information from the mobile device 12 when a synchronization signal of the user is input to the mobile device 12. The mobile device 12 may display an icon indicating that context information is shared with the server 100. When the user touches the icon, context information acquired by the mobile device 12 may be transmitted to the server 100.

As another example, the server 100 may receive context information from the mobile device 12 every time the mobile device 12 acquires the context information. That is, the server 100 may receive position information from the mobile device 12 every time the mobile device 12 acquires the position information thereof.

In operation S820, the server 100 classifies the received context information based on a related home device 16.

The server 100 may classify context information received from the mobile device 12, by using keywords preset for each home device 16. For example, if a keyword related to a washing machine is "sport," the server 100 may classify context information related to "sport" from among the context information received from the mobile device 12. The server 100 may store the classified context information related to "sport" as context information related to the washing machine.

As another example, if a keyword related to a TV is "broadcast program," the server 100 may classify context information related to "broadcast program" from among the context information received from the mobile device 12. The server 100 may store the classified context information related to "broadcast program" as context information related to the TV.

In operation S830, the server 100 receives a trigger signal generated when the mobile device 12 is located at a specific location in the home.

At least one sensor may be provided in each specific location in the home. For example, sensors may be respectively provided in bedrooms, a multipurpose room, a bathroom, a kitchen, the entrance, and a living room in the home. A sensor 14 may detect the mobile device 12 located around a location where the sensor 14 is provided. The sensor 14 may generate a trigger signal when the mobile device 12 is detected. The server 100 may receive the generated trigger signal from the sensor 14.

Operation S830 may correspond to operation S210 described above with reference to FIG. 2.

In operation S840, the server 100 determines a home device 16 corresponding to the specific location.

The trigger signal may include identification values of home devices 16 located around the sensor 14 which has generated the trigger signal. The server 100 may extract the identification values of the home devices 16 located around the sensor 14 from the trigger signal. The server 100 may compare pre-stored identification values of home devices 16 with the extracted identification values of the home devices 16 to specify the home devices 16 located around the sensor 14.

Operation S840 may correspond to operation S220 described above with reference to FIG. 2.

In operation S850, the server 100 transmits context information corresponding to the determined home device 16 from among the classified context information.

For example, if the determined home device 16 is a TV, the server 100 may extract context information related to the TV from among the classified context information. The server 100 may transmit the extracted context information related to the TV to the home device 16.

The home device 16 may determine an operation to be performed by the home device 16 based on the received context information. The home device 16 may use situation information to determine whether conditions premised to determine a specific operation to be performed are satisfied. For example, in order for a TV to play a broadcast program, a condition that a user has been watching the broadcast before entering the home is supposed to be satisfied. The TV may determine whether the user has been watching the broadcast before entering the home, by using context information received from the server 100.

Figure 9:
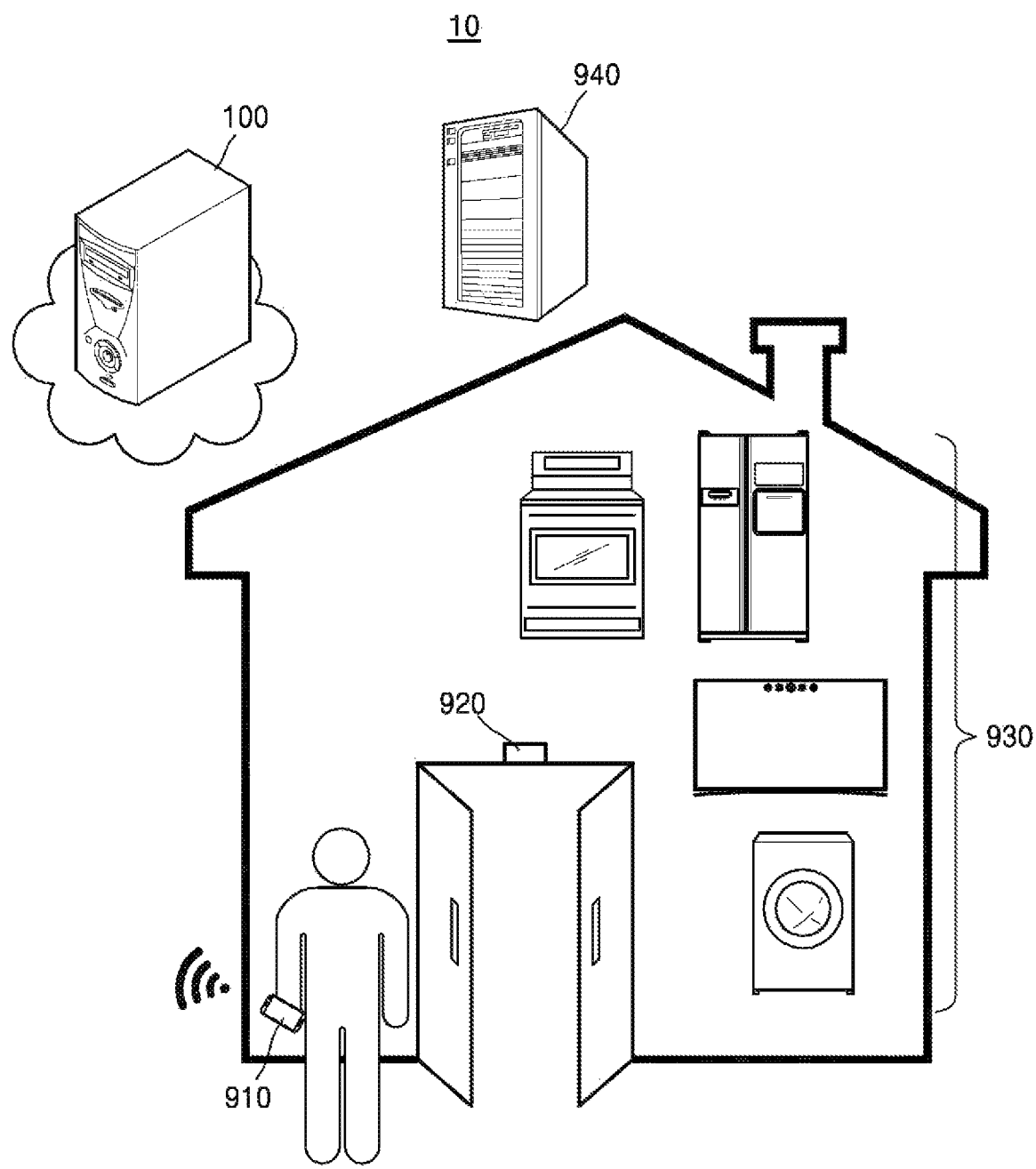
FIG. 9 illustrates a conceptual diagram for describing a system for controlling home devices, according to another exemplary embodiment.

FIG. 9 illustrates a conceptual diagram for describing the system 10 for controlling home devices 930, according to another exemplary embodiment of the inventive concept.

Referring to FIG. 9, the system 10 for controlling the home devices 930 may include the server 100, a mobile device 910, a sensor 920, the home devices 930, and a data storage server 940.

The system 10 for controlling the home devices 930, which is shown in FIG. 9, includes only components related to the present exemplary embodiment. Therefore, it could be understood by those of ordinary skill in the art related to the present exemplary embodiment that other general-use components may be further included besides the components shown in FIG. 9.

The server 100 may communicate with the home devices 930 located in the home. The server 100 may receive identification values of the home devices 930 from the home devices 930, respectively. The server 100 may store the identification values received from the home devices 930. In addition, the server 100 may store identification information of a user who uses the home devices together with the identification values of the home devices 930.

In addition, the server 100 may communicate with the mobile device 910. The server 100 may request the mobile device 910 for information required to control the home devices. For example, the server 100 may request the mobile device 910 for context information when the server 100 receives a trigger signal generated by the sensor 920 in the home. The mobile device 910 may acquire context information of the user or the mobile device 910.

The server 100 may receive context information from the mobile device 910. The server 100 may classify the received context information based on the home devices 930. For example, the server 100 may extract context information related to each of the home devices 930 by using a preset keyword previously determined for each of the home devices 930.

The server 100 may transmit the classified context information to the data storage server 940. The data storage server 940 may store the classified context information received from the server 100.

The server 100 may check a position where the classified context information is stored in the data storage server 940. According to an exemplary embodiment, the server 100 may determine, for each home device 930, a position where the classified context information is to be stored and transmit the determined storage position information to the data storage server 940 together with the classified context information. According to another exemplary embodiment, the data storage server 940 may transmit information on a position where context information of each home device 930 is stored to the server 100.

Alternatively, the server 100 may transmit, to the home devices 930, link information by which context information is downloaded when a trigger signal is received. The link information by which context information is downloaded may be determined according to positions wherein the context information is stored in the data storage server 940.

The home devices 930 may download the context information from the data storage server 940 by using the received link information. The home devices 930 may determine an operation to be performed, by using the context information.

Figure 10:
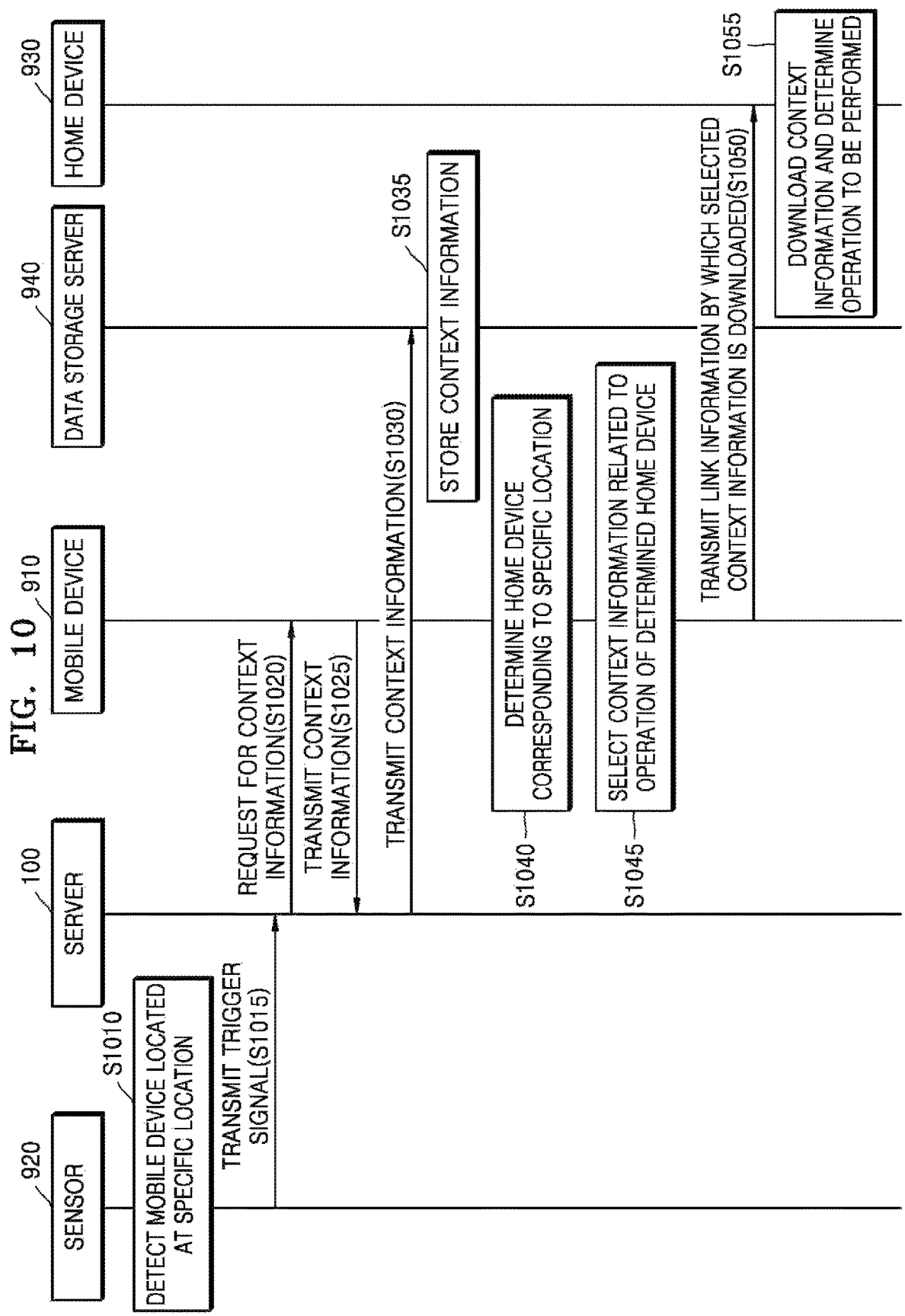
FIG. 10 illustrates an operation flow diagram for describing a system for controlling a home device, according to another exemplary embodiment.

FIG. 10 illustrates an operation flow diagram for describing the system 10 for controlling a home device 930, according to another exemplary embodiment of the inventive concept.

In operation S1010, a sensor 920 detects a mobile device 910 located at a specific location. According to an exemplary embodiment, the sensor 920 may detect the mobile device 910 located where the sensor 920 is located.

Operation S1010 may correspond to operation S310 described above with reference to FIG. 3.

In operation S1015, the sensor 920 transmits a trigger signal to the server 100 when the mobile device 910 is detected. The sensor 920 may generate the trigger signal when the mobile device 910 is detected. The trigger signal may include information on home devices 930 located around the sensor 920. Alternatively, an identification number of the sensor 920, which generates the trigger signal, or location information of the sensor 920 may be included in the trigger signal together with the information on the home devices 930.

Operation S1015 may correspond to operation S320 described above with reference to FIG. 3.

In operation S1020, the server 100 requests the mobile device 910 for context information according to the reception of the trigger signal. The server 100 may determine a mobile device from which context information is to be requested by using a trigger signal.

Operation S1020 may correspond to operation S330 described above with reference to FIG. 3.

In operation S1025, the mobile device 910 transmits the context information to the server 100 in response to the request.

Operation S1025 may correspond to operation S340 described above with reference to FIG. 3.

In operation S1030, the server 100 transmits the context information to the data storage server 940.

According to an exemplary embodiment, the server 100 may classify context information received from the mobile device 910, by using a keyword preset for each home device 930. The server 100 may transmit the context information classified for each home device 930 to the data storage server 940.

According to another exemplary embodiment, the server 100 may determine information on a position where the classified context information is to be stored in the data storage server 940. The server 100 may transmit the determined position information to the data storage server 940 together with the classified context information.

In operation S1035, the data storage server 940 stores the context information received from the server 100.

According to an exemplary embodiment, the data storage server 940 may receive information on a position where the context information is to be stored, together with the context information. The data storage server 940 may store the received context information based on the received position information. For example, the data storage server 940 may store the context information based on position information determined for each of the home devices 930.

According to another exemplary embodiment, the data storage server 940 may store the context information in a random storage position. The data storage server 940 may transmit position information indicating the position where the received context information is stored, as a response to the reception of the context information.

In operation S1040, the server 100 determines the home device 930 corresponding to the specific location.

As described above, the trigger signal may include information on home devices 930 located around the sensor 920 which has generated the trigger signal. The server 100 may extract identification values of the home devices 930 located around the sensor 920 from the trigger signal. The server 100 may compare pre-stored identification values of home devices 930 with the extracted identification values of the home devices 930 to specify the home devices 930 located around the sensor 920.

Operation S1040 may correspond to operation S350 described above with reference to FIG. 3.

In operation S1045, the server 100 selects context information related to an operation of the determined home device 930.

The server 100 may previously store keywords by which context information related to operations of home devices 930 is identified. The server 100 may select context information required to determine the operation to be performed by the determined home device 930 from among received context information by using the pre-stored keywords.

In operation S1050, the server 100 transmits, to the determined home device 930, link information by which the selected context information is downloaded. The link information by which the selected context information is downloaded may be determined according to a position where the context information is stored.

In operation S1055, the home device 930 downloads the context information from the data storage server 940, by using the received link information. The home device 930 may determine an operation to be performed, by using the context information.

Figure 11:
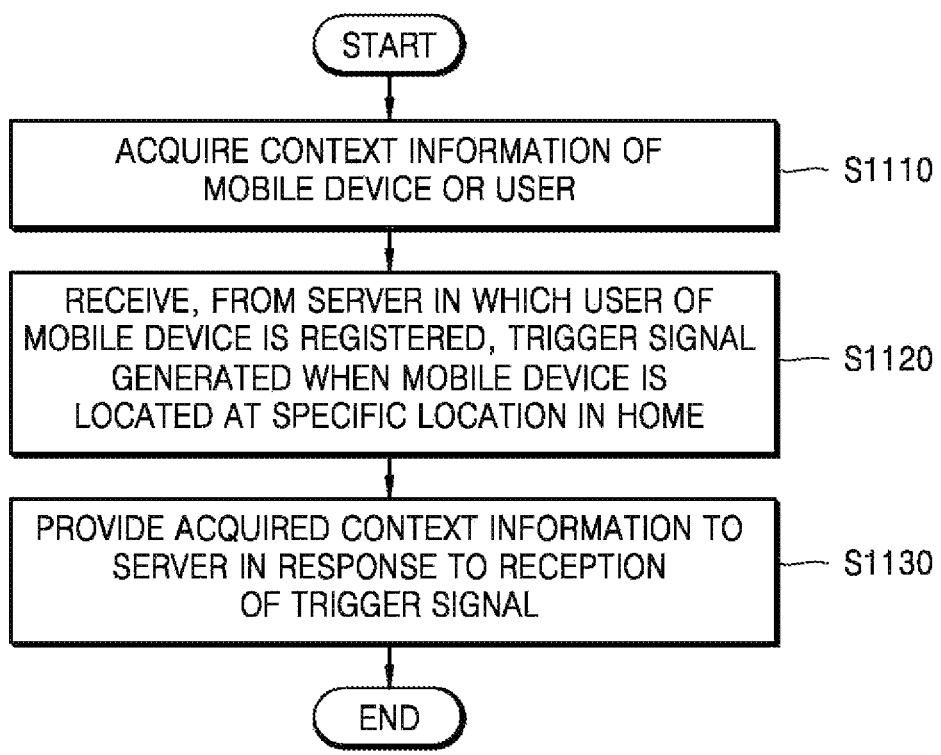
FIG. 11 illustrates a flowchart for describing a method by which a mobile device controls home devices, according to an exemplary embodiment.

FIG. 11 illustrates a flowchart for describing a method by which a mobile device 12 controls home devices 16, according to an exemplary embodiment of the inventive concept.

In operation S1110, the mobile device 12 acquires context information of the mobile device 12 or a user. The context information acquired by the mobile device 12 may be used to predict a situation of the user.

According to an exemplary embodiment, the mobile device 12 may acquire information regarding a position, a time, and a weather of the mobile device 12.

For example, the mobile device 12 may store information on a location change along a time. The mobile device 12 may store information that the mobile device 12 was at a location X at 9 AM and is at a location Y at 8 PM. In addition, the mobile device 12 may determine a transportation means by collecting information regarding a changing time between locations of the mobile device 12, a sound around the mobile device 12, and the like. For example, the mobile device 12 may determine whether the user moved from the location X to the location Y by bus or on foot.

In addition, the mobile device 12 may acquire information regarding an execution history of applications executed by the mobile device 12. That is, the mobile device 12 may acquire types of applications executed for one day, an execution time of the applications, and information acquired according to the execution of the applications. For example, the mobile device 12 may acquire an execution time of an exercise support application executed during the use of a running machine and exercise information acquired during the use of the running machine.

In addition, the mobile device 12 may acquire information regarding activity details of the user, lifestyle, a consumption list, a schedule, and preferences of the user. For example, the mobile device 12 may acquire information regarding a wake-up time and an office closing time of the user. In addition, the mobile device 12 may acquire information regarding the user's favorite movie and music taste by using types of movie and music played in the mobile device 12. As another example, the mobile device 12 may acquire information regarding products purchased by the user, through electronic payment details.

In operation S1120, the mobile device 12 receives, from the server 100 in which the user of the mobile device 12 is registered, a trigger signal generated when the mobile device 12 is located at a specific location in the home.

The server 100 may store information regarding at least one home device 16 in the home, which is controlled by the server 100, information regarding the user of the home devices 16, and the like. For example, the server 100 may acquire identification information of the user and identification values of the home devices 16 by using information recorded in a website provided by the server 100. In addition, the server 100 may acquire an identification value of the mobile device 12 used by the user.

At least one sensor 14 may be provided at each specific location in the home. For example, sensors may be respectively provided in bedrooms, a multipurpose room, a bathroom, a kitchen, the entrance, and a living room in the home. A sensor 14 may detect the mobile device 12 located around a location where the sensor 14 is provided. The sensor 14 may generate a trigger signal when the mobile device 12 is detected. The server 100 may receive the generated trigger signal from the sensor 14.

The server 100 may transmit the received trigger signal to the mobile device 12. As another example, the server 100 may transmit, to the mobile device 12, a context information request signal generated based on the received trigger signal.

In operation S1130, the mobile device 12 provides acquired context information to the server 100 in response to the reception of the trigger signal.

For example, the mobile device 12 may transmit context information to the server 100 in response to the trigger signal received from the server 100. As another example, the mobile device 12 may transmit context information to the server 100 during a preset period.

Figure 12:
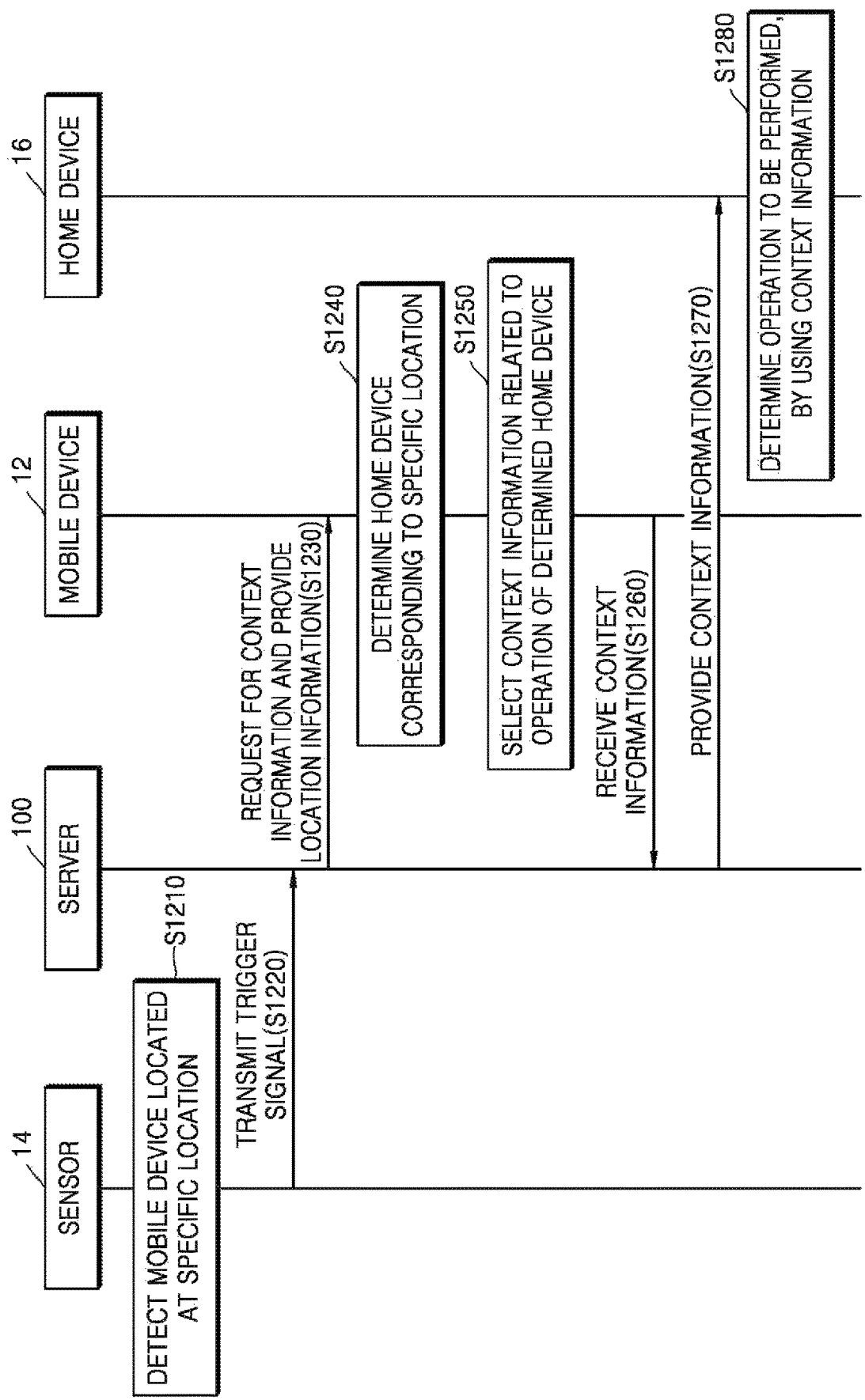
FIG. 12 illustrates an operation flow diagram for describing in detail a system for controlling a home device, according to another exemplary embodiment.

FIG. 12 illustrates an operation flow diagram for describing in detail the system 10 for controlling a home device 16, according to another exemplary embodiment of the inventive concept.

In operation S1210, a sensor 14 detects a mobile device 12 located at a specific location. According to an exemplary embodiment, the sensor 14 may detect the mobile device 12 located where the sensor 14 is located.

Operation S1210 may correspond to operation S310 described above with reference to FIG. 3.

In operation S1220, the sensor 14 transmits a trigger signal to the server 100 when the mobile device 12 is detected. The sensor 14 may generate the trigger signal when the mobile device 12 is detected. The trigger signal may include information on home devices 16 located around the sensor 14. The sensor 14 may transmit the generated trigger signal to the server 100.

Operation S1220 may correspond to operation S320 described above with reference to FIG. 3.

In operation S1230, the server 100 requests the mobile device 12 for context information according to the reception of the trigger signal.

The server 100 may request the mobile device for context information by transmitting the received trigger signal to the mobile device 12.

In operation S1240, the mobile device 12 determines a home device 16 corresponding to the specific location. The mobile device 12 may previously store identification values of home devices 16 located in the home of the user. The mobile device 12 may determine a home device 16 located as a specific location by using an identification value of the home device 16, which is included in the received trigger signal.

In operation S1250, the mobile device 12 selects context information related to an operation of the determined home device 16.

The context information stored in the mobile device 12 may include information related to a situation of the user using the mobile device 12. The mobile device 12 may extract context information of the home device 16 determined based on the trigger signal from among the stored context information.

For example, the mobile device 12 may store information regarding each of the home devices 16 located in the home of the user. The information regarding each of the home devices 16 may include keyword information related to each of the home devices 16.

The mobile device 12 may determine a home device 16 by using the identification value of the home device 16, which is included in the received trigger signal. The mobile device 12 may extract the context information of the determined home device 16 from among the stored context information by using a keyword related to the determined home device 16.

In operation S1260, the server 100 receives the selected context information from the mobile device 12.

In operation S1270, the server 100 provides the received context information to the determined home device 16. The server 100 may determine a home device 16 to which the context information is to be transmitted, by using the trigger signal received from the sensor 14.

In operation S1280, the determined home device 16 determines an operation to be performed by the home device 16, by using the context information received from the server. For example, when a TV receives, from the server 100, context information related to a broadcast program which the user has watched, the TV may perform a display operation of the TV so as to play the broadcast program from a frame immediately after the frame which the user has watched.

Figure 13:
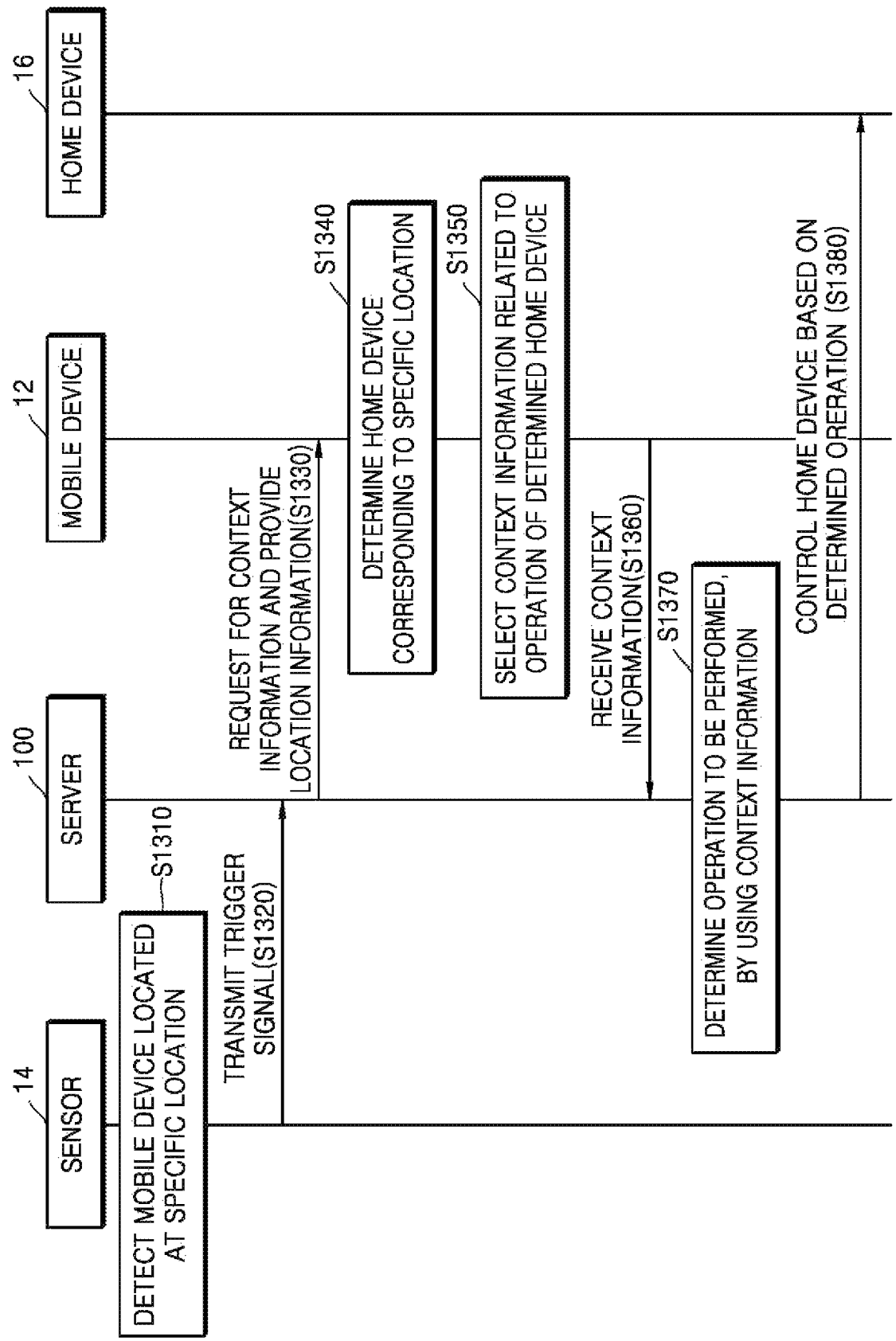
FIG. 13 illustrates an operation flow diagram for describing in detail a system for controlling a home device, according to another exemplary embodiment.

FIG. 13 illustrates an operation flow diagram for describing in detail the system 10 for controlling a home device 16, according to another exemplary embodiment of the inventive concept.

In operation S1310, a sensor 14 detects a mobile device 12 located at a specific location.

Operation S1310 may correspond to operation S1210 described above with reference to FIG. 12.

In operation S1320, the sensor 14 transmits a trigger signal to the server 100 when the mobile device 12 is detected.

Operation S1320 may correspond to operation S1220 described above with reference to FIG. 12.

In operation S1330, the server 100 requests the mobile device 12 for context information according to the reception of the trigger signal.

Operation S1330 may correspond to operation S1230 described above with reference to FIG. 12.

In operation S1340, the mobile device 12 determines a home device 16 corresponding to the specific location.

Operation S1340 may correspond to operation S1240 described above with reference to FIG. 12.

In operation S1350, the mobile device 12 selects context information related to an operation of the determined home device 16.

Operation S1350 may correspond to operation S1250 described above with reference to FIG. 12.

In operation S1360, the server 100 receives the selected context information from the mobile device 12.

Operation S1360 may correspond to operation S1260 described above with reference to FIG. 12.

In operation S1370, the server 100 determines operation to be performed by the home device 16, by using the context information. For example, when the context information includes information related to a broadcast program which the user has watched, the server 100 determines the operation as displaying the TV so as to play the broadcast program from a frame immediately after the frame which the user has watched.

In operation S1380, the server 100 controls the home device 16 based on the determined operation. For example, the server 100 sends a control signal to the TV for displaying the broadcast program which the user has watched.

Figure 14:
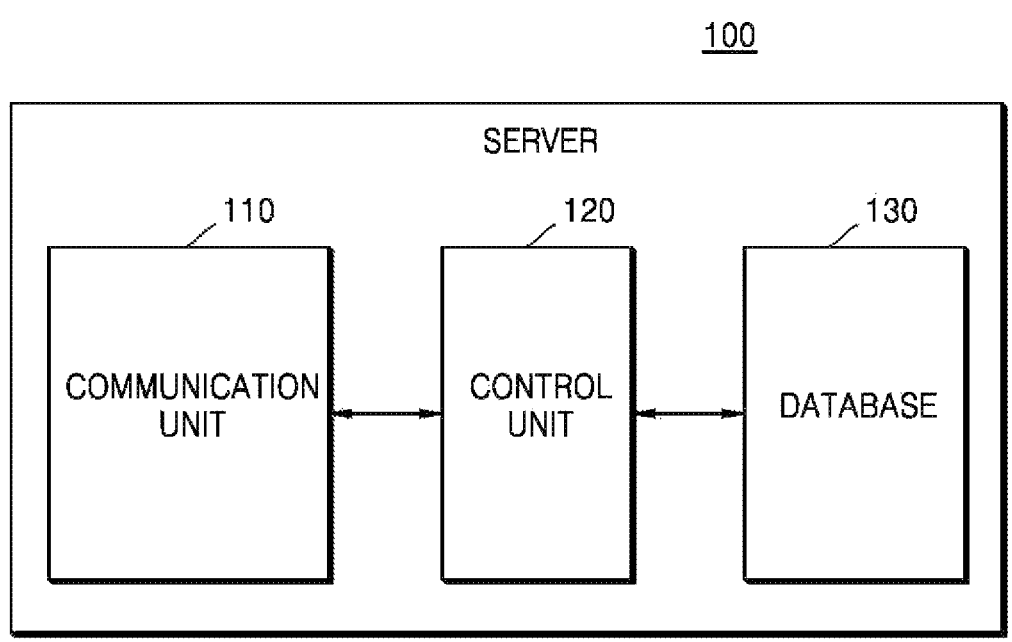
FIG. 14 illustrates a block diagram of a server for controlling home devices, according to an exemplary embodiment.

FIG. 14 illustrates a block diagram of the server 100 for controlling home devices 16, according to an exemplary embodiment of the inventive concept.

Referring to FIG. 14, the server 100 may include a communication unit 110, a control unit 120, and a database 130.

The server 100 shown in FIG. 14 includes only components related to the present exemplary embodiment. Therefore, it could be understood by those of ordinary skill in the art related to the present exemplary embodiment that other general-use components may be further included besides the components shown in FIG. 14.

The communication unit 110 (e.g., a communicator, communication processor, etc.) receives a trigger signal generated by a sensor 14 in the home when a mobile device 12 is located at a specific location. The communication unit 110 provides selected context information to a home device 16.

According to an exemplary embodiment, the communication unit 110 requests the mobile device 12 for context information of the mobile device 12 or a user when the trigger signal is received.

The communication unit 110 may receive context information from the mobile device 12 during a preset period. According to another exemplary embodiment, the communication unit 110 may provide the received context information to the data storage server 940. The context information may be classified according to home devices 16 located in the home and stored in the data storage server 940.

The communication unit 110 may transmit, to the home device 16, link information for downloading the context information stored in the data storage server 940.

The control unit 120 (e.g., a controller, processor, etc.) determines a home device 16 corresponding to a specific location by using a trigger signal and selects context information related to an operation of the determined home device 16 from among context information received from the mobile device 12. The trigger signal may include an identification value of the mobile device 12, which is acquired by a sensor 14 when the mobile device 12 is located at a specific location in the home.

The control unit 120 may determine the mobile device 12 by comparing the identification value of the mobile device 12 with pre-stored identification values of a plurality of mobile devices. The control unit 120 may control the communication unit 110 to request the mobile device 12 for context information of the mobile device 12 or the user when the identification value of the mobile device 12 is included in the identification values of the plurality of mobile devices.

The control unit 120 may extract context information to be used to determine an operation to be performed by a home device 16, by using a keyword preset for each home device 16.

The database 130 may store identification information of a plurality of users and identification values of mobile devices of the plurality of users. For example, the database 130 may store an identification value of the user and the identification value of the mobile device 12.

The database 130 may store identification values of home devices located in the home of each of the plurality of users. For example, the database 130 may store identification values of the home devices 16 located in the home of the user. In addition, the database 130 may store keywords of each of the home devices 16 located in the home of the user. The keywords of each of the home devices 16 may be used to extract context information related to each of the home devices 16 from among context information received from the mobile device 12.

Figure 15:
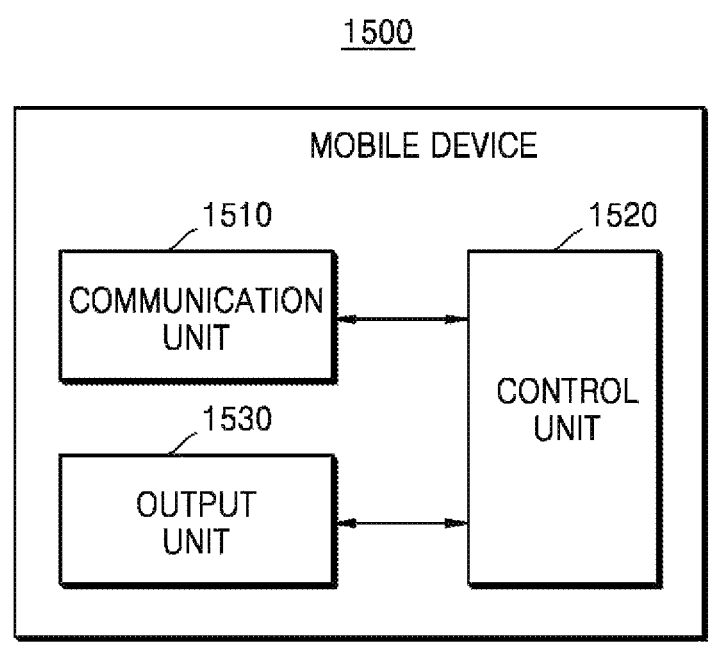

FIGS. 15 and 16 illustrate block diagrams for describing a configuration of a mobile device 1500, according to an exemplary embodiment of the inventive concept.

As shown in FIG. 15, the mobile device 1500 according to an exemplary embodiment of the inventive concept may include a communication unit 1510 (e.g., a communicator, communication processor, etc.), a control unit 1520 (e.g., controller, processor, etc.), and an output unit 1530 (e.g., an output, output device, etc.). However, all the components shown in FIG. 15 are not mandatory. The mobile device 1500 may be implemented by more or less components than the components shown in FIG. 15.

For example, as shown in FIG. 16, the mobile device 1500 may further include a user input unit 1540 (e.g., a user input, user input device, etc.), a sensing unit 1550 (e.g., a sensor, etc.), an audio/video (A/V) input unit 1560 (e.g., audio/video input, etc., and a memory 1570 besides the communication unit 1510, the control unit 1520, and the output unit 1530.

The communication unit 1510 may acquire context information of the mobile device 1500 or a user. The communication unit 1510 may receive, from a server 100 in which the user of the mobile device 1500 is registered, a trigger signal generated when the mobile device 1500 is located at a specific location in the home.

The communication unit 1410 may provide an identification value of a determined home device and determined context information to the server 100 to which the user of the mobile device 1500 has subscribed.

The communication unit 1510 may include one or more components enabling the mobile device 1500 to communicate with an external device or the server 100. For example, the communication unit 1510 may include a short-range wireless communication unit 1511, a mobile communication unit 1512, and a broadcast reception unit 1513.

The short-range wireless communication unit 1511 may include a Bluetooth communication unit, a Bluetooth low energy (BLE) communication unit, a near-field wireless communication unit, a wireless local area network (WLAN) (Wi-Fi) communication unit, a Zigbee communication unit, an infrared data association (IrDA) communication unit, Wi-Fi Direct (WFD) communication unit, an ultra-wideband (UWB) communication unit, an Ant+ communication unit, and the like but is not limited thereto.

The mobile communication unit 1512 may transmit and receive a wireless signal to and from at least one of a base station, an external terminal, and a server in a mobile communication network. Herein the wireless signal may include a voice call signal, a video call signal, or various types of data according to text/multimedia message transmission and reception.

The broadcast reception unit 1513 may receive a broadcast signal and/or broadcast related information from the outside through a broadcast channel, and the broadcast channel may include a satellite channel and a terrestrial channel. According to implemented examples, the mobile device 1500 may not include the broadcast reception unit 1513.

The control unit 1520 may commonly control a general operation of the mobile device 1500. The control unit 1520 may generally control the communication unit 1510, the output unit 1530, the user input unit 1540, the sensing unit 1550, the A/V input unit 1560, and the like by executing programs stored in the memory 1570.

The control unit 1520 may determine the acquired context information to be provided to the server 100 in response to the received trigger signal. From among the acquired context information, context information related to an operation of a home device 16 corresponding to a specific location may be provided from the server 100 to the home device 16.

According to another exemplary embodiment, the control unit 1520 may determine a home device 16 corresponding to a specific location when a trigger signal is received. The control unit 1520 may determine context information related to an operation of the home device 16 from among the context information of the mobile device 1500 or the user.

The output unit 1530 is to output an audio signal, a video signal, or a vibration signal and may include a display unit 1531, an acoustic output unit 1532, a vibration motor 1533, haptic feedback device, tapping feedback device, and the like.

The display unit 1531 displays information processed by the mobile device 1500. The display unit 1531 may output a result which occurs according to the execution of at least one task selected when a type of an execution input acquired by the user input unit 1540 corresponds to a preset type according to a previously acquired hovering input.

The display unit 1531 may display an identification mark indicating an application to be executed by the mobile device 1500 or an operation of the application. For example, the identification mark may include an icon or the like.

When the display unit 1531 and a touch pad form a layer structure to configure a touch screen, the display unit 1531 may be used as not only an output device but also an input device. The display unit 1531 may include at least one of a liquid crystal display, a thin-film transistor liquid crystal display, an organic light-emitting diode, a flexible display, a three-dimensional (3D) display, and an electrophoretic display. The mobile device 1500 may include two or more display units 1531 according to an implementation form of the mobile device 1400. The two or more display units 1531 may be disposed to face each other by using a hinge.

The acoustic output unit 1532 may output audio data received through the communication unit 1510 or stored in the memory 1570. In addition, the acoustic output unit 1532 may output an acoustic signal related to a function (e.g., a call signal reception sound, a message reception sound, or an alarm sound) performed by the mobile device 1500. The acoustic output unit 1532 may include a speaker, a buzzer, and the like.

The vibration motor 1533 may output a vibration signal. For example, the vibration motor 1533 may output a vibration signal corresponding to an output of audio data or video data (e.g., a call signal reception sound, a message reception sound, or the like). In addition, the vibration motor 1533 may output a vibration signal when a touch is inputted through the touch screen.

The user input unit 1540 may indicate a means through which a user inputs data for controlling the mobile device 1500. For example, the user input unit 1440 may include a keypad, a dome switch, a touch pad (a capacitive overlay touch pad, a resistive overlay touch pad, an IR beam touch pad, a surface acoustic wave touch pad, an integral strain gauge touch pad, a piezoelectric touch pad, or the like), a jog wheel, a jog switch, and the like but is not limited thereto.

The sensing unit 1550 may sense a state of the mobile device 1500 or a state of the surroundings of the mobile device 1500 and transmit the sensed information to the control unit 1520.

The sensing unit 1550 may include at least one of a magnetic sensor 1551, an acceleration sensor 1552, a temperature/humidity sensor 1553, an IR sensor 1554, a gyroscope sensor 1555, a position sensor (e.g., global positioning system (GPS)) 1556, an atmospheric pressure sensor 1557, a proximity sensor 1458, and an RGB sensor (illuminance sensor) 1559 but is not limited thereto. The function of each of the sensors 1551 to 1559 may be intuitively inferred by those of ordinary skill in the art from the names thereof, and thus a detailed description thereof is omitted.

The A/V input unit 1560 is to input an audio signal or a video signal and may include a camera 1561, a microphone 1562, and the like. The camera 1561 may acquire an image frame of a still image, a moving picture, or the like through an image sensor in a video call mode or a capturing mode. An image captured through the image sensor may be processed by the control unit 1520 or a separate image processing unit (not shown).

The image frame processed by the camera 1561 may be stored in the memory 1570 or transmitted to the outside through the communication unit 1510. Two or more cameras 1561 may be provided depending on an implementation form of the mobile device 1500.

The microphone 1562 may receive an external acoustic signal and process the external acoustic signal to electrical voice data. For example, the microphone 1562 may receive an acoustic signal from an external device or a speaker. The microphone 1562 may use various noise cancellation algorithms to cancel noise generated during a process of receiving an external acoustic signal.

The memory 1570 may store programs for processing and control of the control unit 1520 and store inputted/outputted data (e.g., a plurality of menus, a plurality of first-layer sub-menus corresponding to each of the plurality of menus, a plurality of second-layer sub-menus corresponding to each of the plurality of first-layer sub-menus, and the like).

The memory 1570 may include at least one type of storage medium among a flash memory type memory, a hard disk type memory, a multimedia card micro type memory, a card type memory (e.g., a secure digital (SD) or extreme digital (XD) memory or the like), random access memory (RAM), static RAM (SRAM), read only memory (ROM), electrically erasable programmable ROM (EEPROM), PROM, a magnetic memory, a magnetic disc, and an optical disc. In addition, the mobile device 1500 may operate a web storage or a cloud server which performs a storage function of the memory 1570 over the Internet.

The programs stored in the memory 1570 may be classified into a plurality of modules according to functions thereof, e.g., a user interface (UI) module 1571, a touch screen module 1572, an alarm module 1573, and the like.

The UI module 1571 may provide a specified UI, graphic user interface (GUI), or the like interoperating with the mobile device 1500 for each application. The touch screen module 1572 may sense a touch gesture of the user on the touch screen and transmit information regarding the touch gesture to the control unit 1520. According to an exemplary embodiment, the touch screen module 1572 may recognize and analyze a touch code. The touch screen module 1572 may be configured by separate hardware including a controller.

Various sensors for sensing a touch or a proximity touch on the touch screen may be provided inside or nearby the touch screen. An example of a sensor for sensing a touch on the touch screen is a tactile sensor. The tactile sensor is a sensor for sensing a contact of a specific object at a degree of human feeling or more. The tactile sensor may sense various pieces of information such as roughness of a contact surface, hardness of a contact object, a temperature of a contact point, and the like.

Another example of a sensor for sensing a touch on the touch screen is a proximity sensor.

The proximity sensor is a sensor for detecting whether an object approaching a predetermined detection surface or a nearby object exists by using an electromagnetic force or an IR ray without a mechanical contact. Examples of the proximity sensor are a transmissive optoelectric sensor, a direct reflective optoelectric sensor, a mirror reflective optoelectric sensor, a high-frequency oscillation proximity sensor, a capacitive proximity sensor, a magnetic proximity sensor, an IR proximity sensor, and the like. Examples of a touch gesture of the user are a tap, a touch & hold, a double tap, a drag, a panning, a flick, a drag & drop, a swipe, and the like.

The alarm module 1573 may generate a signal for notifying of the occurrence of an event of the mobile device 1500. Examples of an event generated by the mobile device 1500 are call signal reception, message reception, a key signal input, a schedule notification, and the like. The alarm module 1573 may output an alarm signal in a video signal form through the display unit 1531, an alarm signal in an audio signal form through the acoustic output unit 1532, or an alarm signal in a vibration signal form through the vibration motor 1533.

The methods according to one or more exemplary embodiments of the inventive concept may be implemented in a program instruction form executable through various computer means and recorded in a computer-readable recording medium. The computer-readable recording medium may include program instructions, data files, data structures, and the like, taken alone or in combination. The program instructions recorded in the medium may be particularly designed and configured for the one or more exemplary embodiments. Examples of the computer-readable recording medium are magnetic media such as hard disks, floppy disks, and magnetic tapes, optical media such as CD-ROMs and digital versatile discs (DVDs), magneto-optical media such as floptical disks, and hardware devices, such as read-only memory (ROM), random-access memory (RAM), flash memories, and the like, particularly configured to store and execute program instructions. The program instructions include, for example, not only machine language codes made by a compiler but also high-language codes executable by a computer by using an interpreter or the like.

It should be understood that exemplary embodiments described herein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope as defined by the following claims.

What is claimed is:

1. A method by which a server controls a plurality of devices, the method comprising:
   receiving a trigger signal generated by a sensor in a home in response to a mobile device being present at a specific location in the home, the trigger signal including identification values of one or more devices of the plurality of devices that are located around the sensor;
   comparing the identification values with pre-stored identification values of the plurality of devices to determine, from the plurality of devices, a first device and a second device corresponding to the specific location;
   receiving context information indicating a situation of a user from the mobile device;
   comparing the received context information with different keywords that correspond respectively to the first device and the second device and that identify context information related to respective operations of the first device and the second device;
   based on a result of the comparison, selecting first context information for use in determining a first operation to be performed by the first device and second context information for use in determining a second operation to be performed by the second device, wherein the first context information and the second context information are different and correspond respectively to the first device and the second device; and
   providing the selected first context information and the selected second context information to the first device and the second device, respectively, so that the first device performs the first operation corresponding to the first context information and the second device performs the second operation corresponding to the second context information.

2. The method of claim 1, wherein the trigger signal comprises an identification value of the mobile device.

3. The method of claim 2, further comprising determining the mobile device by comparing the identification value of the mobile device with pre-stored identification values of a plurality of mobile devices.

4. The method of claim 1, wherein the context information comprises at least one of information regarding a location of the mobile device, a time, weather, execution history of applications executed by the mobile device, an activity history, lifestyle, a consumption list, a schedule, and preferences of the user.

5. The method of claim 1, further comprising requesting the mobile device for context information of the mobile device or context information of the user according to the reception of the trigger signal.

6. The method of claim 1, further comprising:
   receiving the context information from the mobile device during a preset period; and
   providing the received context information to a data storage server,
   wherein the context information is classified for each of the plurality of devices located in the home and stored in the data storage server.

7. The method of claim 6, wherein the providing of the selected context information comprises transmitting, to each of the plurality of devices, link information for downloading the context information stored in the data storage server.

8. A server for controlling a plurality of devices, the server comprising:
   a communicator; and
   at least one processor is configured to:
   receive a trigger signal generated by a sensor in a home in response to a mobile device being present at a specific location in the home, the trigger signal including identification values of one or more devices of the plurality of devices that are located around the sensor,
   compare the identification values with pre-stored identification values of the plurality of devices to determine, from the plurality of devices, a first device and a second device corresponding to the specific location,
   receive context information indicating a situation of a user from the mobile device,
   compare the received context information with different keywords that correspond respectively to the first device and the second device and that identify context information related to respective operations of the first device and the second device;
   based on a comparison result, select first context information for use in determining a first operation to be performed by the first device and second context information for use in determining a second operation to be performed by the second device, wherein the first context information and the second context information are different and correspond respectively to the first device and the second device; and provide the selected first context information and the selected second context information to the first device and the second device, respectively, so that the first device performs the first operation corresponding to the first context information and the second device performs the second operation corresponding to the second context information.

9. The server of claim 8, wherein the trigger signal comprises an identification value of the mobile device.

10. The server of claim 9, wherein the at least one processor is further configured to:
    determine the mobile device by comparing the identification value of the mobile device with pre-stored identification values of a plurality of mobile devices.

11. The server of claim 8, wherein the context information comprises at least one of information regarding a location of the mobile device, a time, weather, execution history of applications executed by the mobile device, an activity history, lifestyle, a consumption list, a schedule, and preferences of the user.

12. The server of claim 8, wherein the at least one processor is further configured to request the mobile device for context information of the mobile device or context information of the user according to the reception of the trigger signal.

13. The server of claim 8, wherein the at least one processor is further configured to:
    receiving the context information from the mobile device during a preset period, and
    provide the received context information to a data storage server,
    wherein the context information is classified for each of the plurality of devices located in the home and stored in the data storage server.

14. The server of claim 13, wherein the at least one processor is further configured to transmit, to each of the plurality of devices, link information for downloading the context information stored in the data storage server.

15. A non-transitory computer-readable recording medium having recorded thereon a computer-readable program for performing the method of claim 1.

16. The method of claim 1, wherein a first keyword of the different keywords corresponds to the first device of the plurality of devices, and a second keyword that is different from the first keyword corresponds to the second device of the plurality of devices.

17. The method of claim 1, wherein a plurality of first keywords of the different keywords corresponds to the first device of the plurality of devices, and a plurality of second keywords of the different keywords corresponds to the second device of the plurality of devices.

18. The method of claim 17, wherein the plurality of first keywords include travel, exercise, broadcast program, and schedule and the first device is a television, and the plurality of second keywords include sport, and the second device is a washing machine.

19. The method of claim 1, wherein the different keywords indicate conditions for performing respective operations of the first device and the second device and a type of application to be executed by the mobile device.

20. The server of claim 8, wherein the different keywords indicate conditions for performing respective operations of the first device and the second device and a type of application to be executed by the mobile device.

* * * * *